(12) United States Patent
Kanamori

(10) Patent No.: US 10,437,538 B2
(45) Date of Patent: Oct. 8, 2019

(54) INFORMATION PROCESSING METHOD FOR OBTAINING PRINTER STATUS AND NON-VOLATILE STORAGE MEDIUM

(71) Applicant: CANON KABUSHIKI KAISHA, Tokyo (JP)

(72) Inventor: Hideyuki Kanamori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/138,293

(22) Filed: Sep. 21, 2018

(65) Prior Publication Data
US 2019/0107984 A1    Apr. 11, 2019

(30) Foreign Application Priority Data
Oct. 6, 2017  (JP) ................................. 2017-196256

(51) Int. Cl.
    *G06F 3/12* (2006.01)
(52) U.S. Cl.
    CPC .................................. *G06F 3/1259* (2013.01)
(58) Field of Classification Search
    None
    See application file for complete search history.

(56) References Cited

U.S. PATENT DOCUMENTS

| | | | |
|---|---|---|---|
| 9,250,849 B2 | 2/2016 | Chigusa | |
| 9,552,185 B2 | 1/2017 | Kanamori | |
| 2012/0293834 A1* | 11/2012 | Honda | G06F 3/1204 358/1.15 |
| 2014/0009792 A1* | 1/2014 | Kanamori | G06F 3/1207 358/1.15 |

FOREIGN PATENT DOCUMENTS

JP    2014-032647 A    2/2014

* cited by examiner

*Primary Examiner* — Henok Shiferaw
(74) *Attorney, Agent, or Firm* — Venable LLP

(57) ABSTRACT

An information processing method for an information processing apparatus to obtain status information on a printer includes determining whether a submitted job is a print job for causing the printer to perform a print operation or a status obtaining job for obtaining the status information without causing the printer to perform print operation, determining whether a connection method between the information processing apparatus and the printer is a network connection, and transmitting dummy data for obtaining a response from the printer. The dummy data is transmitted when the submitted job is determined to be the status obtaining job and the connection method is determined to be the network connection, and the dummy data is not transmitted in a case where the submitted job is determined to be the status obtaining job and the connection method is determined not to be the network connection.

30 Claims, 17 Drawing Sheets

* ModelName: Printer A

* cupsIPPSupplies: False

FIG.8A

* ModelName: Printer B

* cupsIPPSupplies: True

FIG.8B

* ModelName: Printer C

* cupsIPPSupplies: False

FIG.8C

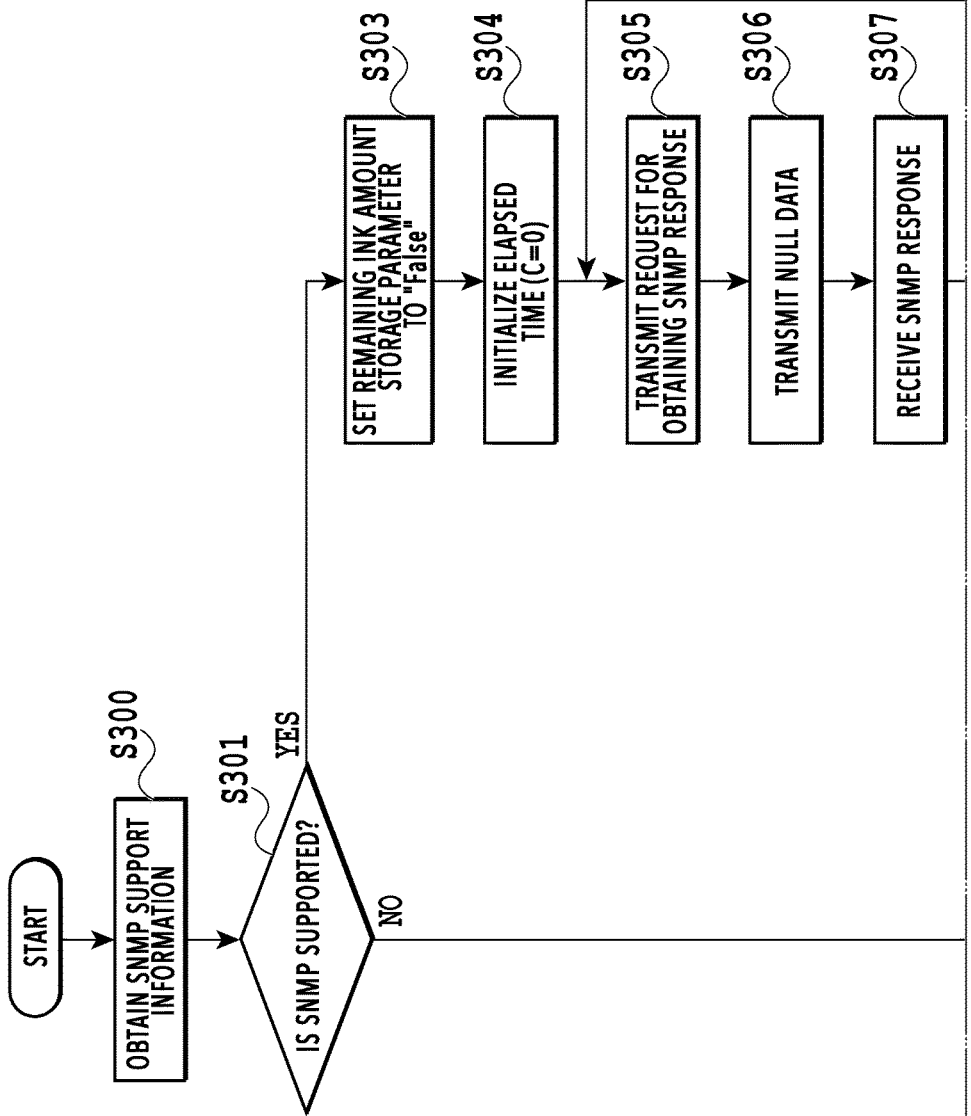

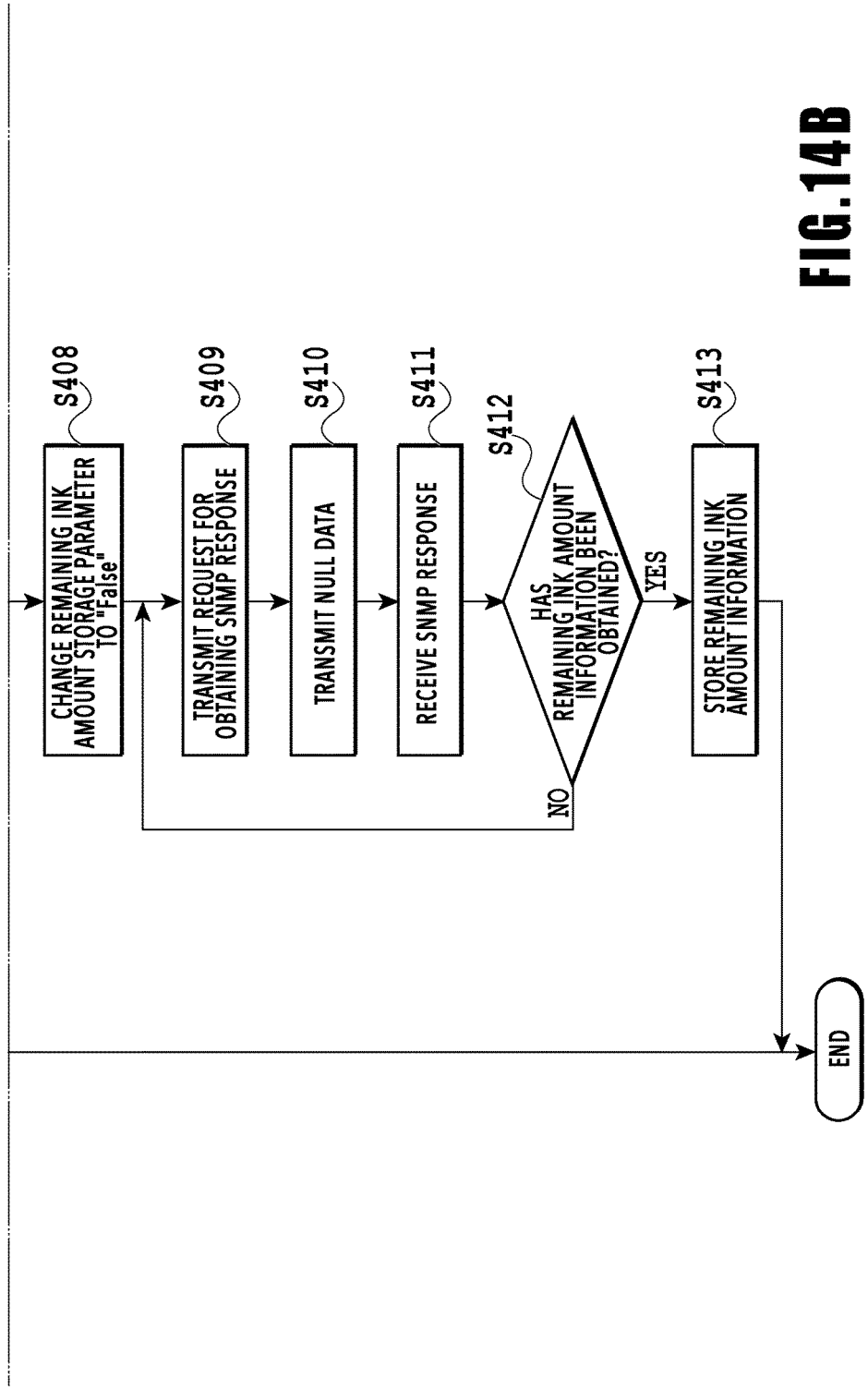

INFORMATION PROCESSING METHOD FOR OBTAINING PRINTER STATUS AND NON-VOLATILE STORAGE MEDIUM

BACKGROUND OF THE INVENTION

Field of the Invention

The present invention relates to a method for obtaining status information on a printer in a printing system.

Description of the Related Art

As an operating system (hereinafter referred to as an OS) that can be installed into a personal computer (PC), there is known macOS (registered trademark) developed by Apple Inc. In macOS, by using predetermined utility, it is possible to obtain a status of a printer in wired or wireless connection and display, on a screen, information such as an amount of remaining ink in an ink tank mounted on the printer.

At this time, the utility allows a vendor module provided by a printer vendor or an OS standard module provided by an OS to operate according to a communication protocol supported by a printer and a connection environment between a PC and a printer. The vendor module or OS standard module obtains status information on a printer at a predetermined timing and stores it in a shared area that can be referenced by the utility. The utility reads necessary information from the information stored in the shared area and displays it on a screen of a PC.

Japanese Patent Laid-Open No. 2014-32647 discloses a method for automatically constructing an optimum environment of a printing system by identifying a printing protocol and making settings for bidirectional communications between a PC and a printer depending on the printing protocol, even without a user's recognition of the printing protocol.

In a macOS environment, however, the vendor module (printer driver) can bidirectionally communicate with the connected printer only through an OS standard module such as a USB backend and an IPP backend. In addition, in the IPP backend, the status information on a printer and the like can be obtained only in a case where print data was transmitted to the printer.

For this reason, traditionally, in a case where a user trying to check an amount of remaining ink in a printer and the like accesses utility of a PC, the utility displays a screen based on the information obtained and stored in the last print operation. In other words, it was difficult for a user to check nearly real-time information about a status of a printer such as an amount of remaining ink.

SUMMARY OF THE INVENTION

The present invention has been made to solve the above problems. Accordingly, an object of the present invention is to provide an information processing method and printing system that can obtain nearly real-time status information on a printer connected via a network and notify it to a user.

According to a first aspect of the present invention, there is provided an information processing method for an information processing apparatus to obtain status information on a printer, the method comprising: determining whether a submitted job is a print job for causing the printer to perform print operation or a status obtaining job for obtaining the status information without causing the printer to perform print operation; and transmitting dummy data for obtaining a response from the printer in a case where the submitted job is determined to be the status obtaining job.

According to a second aspect of the present invention, there is provided a storage medium storing a program for performing an information processing method for an information processing apparatus to obtain status information on a printer, the information processing method comprising: determining whether a submitted job is a print job for causing the printer to perform print operation or a status obtaining job for obtaining the status information without causing the printer to perform print operation; and transmitting dummy data for obtaining a response from the printer in a case where the submitted job is determined to be the status obtaining job.

Further features of the present invention will become apparent from the following description of exemplary embodiments with reference to the attached drawings.

BRIEF DESCRIPTION OF THE DRAWINGS

FIG. 8A to FIG. 8C are diagrams showing a specific content of parameters stored in a PPD file;

FIG. 12 is a diagram showing the relationship of FIGS. 12A and 12B;

FIG. 12A is a flowchart for explaining status information obtaining processing for IPP connection;

DESCRIPTION OF THE EMBODIMENTS

Hereinafter, preferable embodiments of the present invention will be described in detail with reference to the attached drawings.

(First Embodiment)

Figure 1:
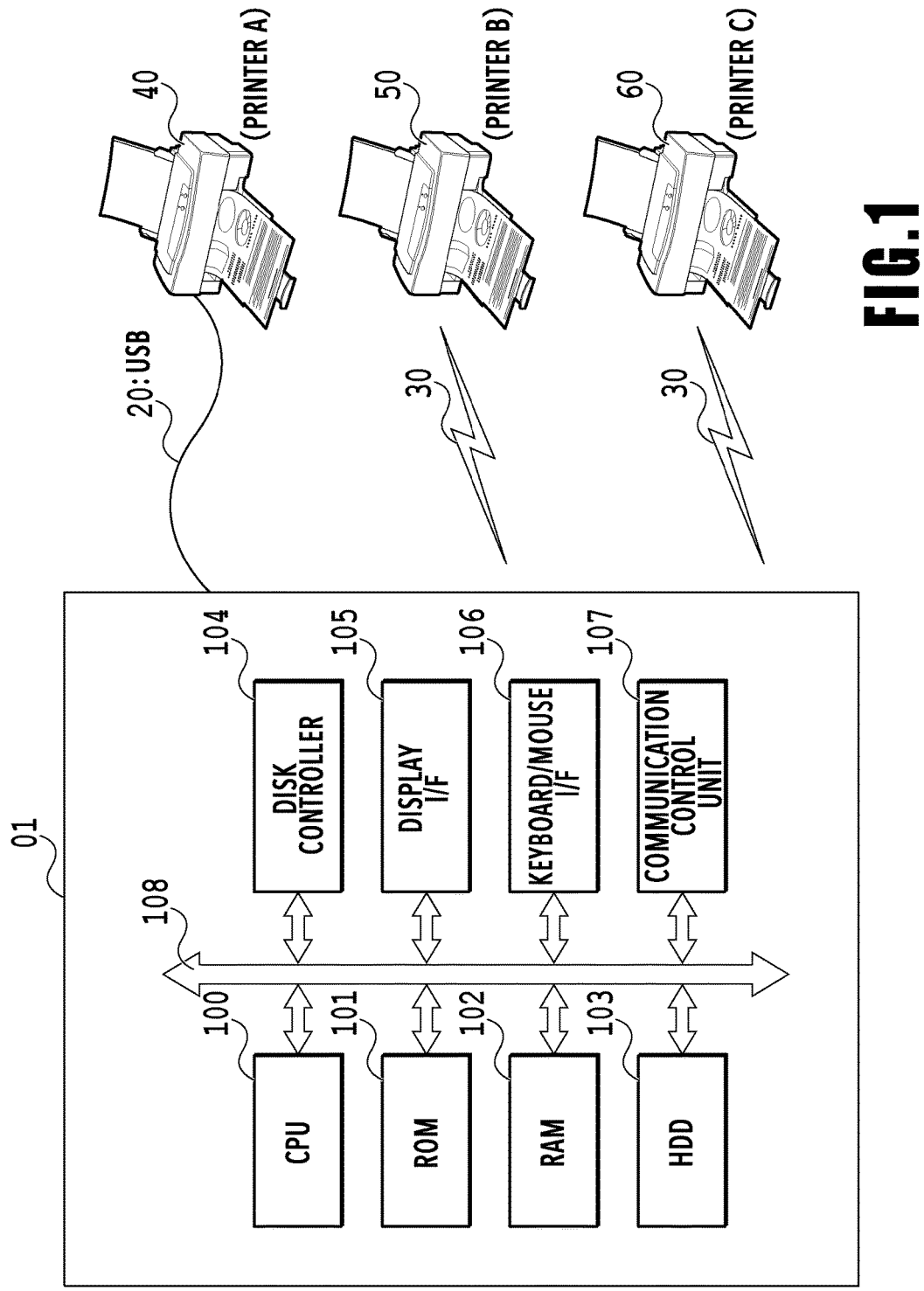
FIG. 1 is a diagram showing a hardware configuration of a printing system that can be used in the present invention.

FIG. 1 is a diagram showing a hardware configuration of a printing system used in the present embodiment. In FIG. 1, three printers, a printer A40, a printer B50, and a printer C60, are connected to a PC 01 which is an information processing apparatus of the present invention. The printer A40 is in wired connection via a communication interface 20. In this example, a USB (Universal Serial Bus) is used as a communication interface. The printer B50 and the printer C60 are connected via a network 30. For the network, a LAN (Local Area Network), WAN (Wide Area Network), and the like can be used. A form of network connection may be either wired or wireless, or a combination thereof.

The PC 01 includes a CPU 100, a ROM 101, a hard disk 103, a RAM 102, a disk controller 104, a display I/F 105, a keyboard/mouse I/F 106, a communication control unit 107, and the like, and they are connected to each other via a bus 108. The CPU 100 controls all of the devices included in the PC 01 while using the RAM 102 as a work area in accordance with programs stored in the ROM 101 and the hard disk 103. For instance, after a predetermined program is read from the ROM 101 or the hard disk 103 and loaded into the RAM 102, the CPU 100 performs various kinds of processing in accordance with the program, so that also an OS and application software are realized. As for the flowcharts which will be described later as well, the CPU 100 performs the processing in accordance with programs while using the RAM 102 as a work area.

Figure 2:
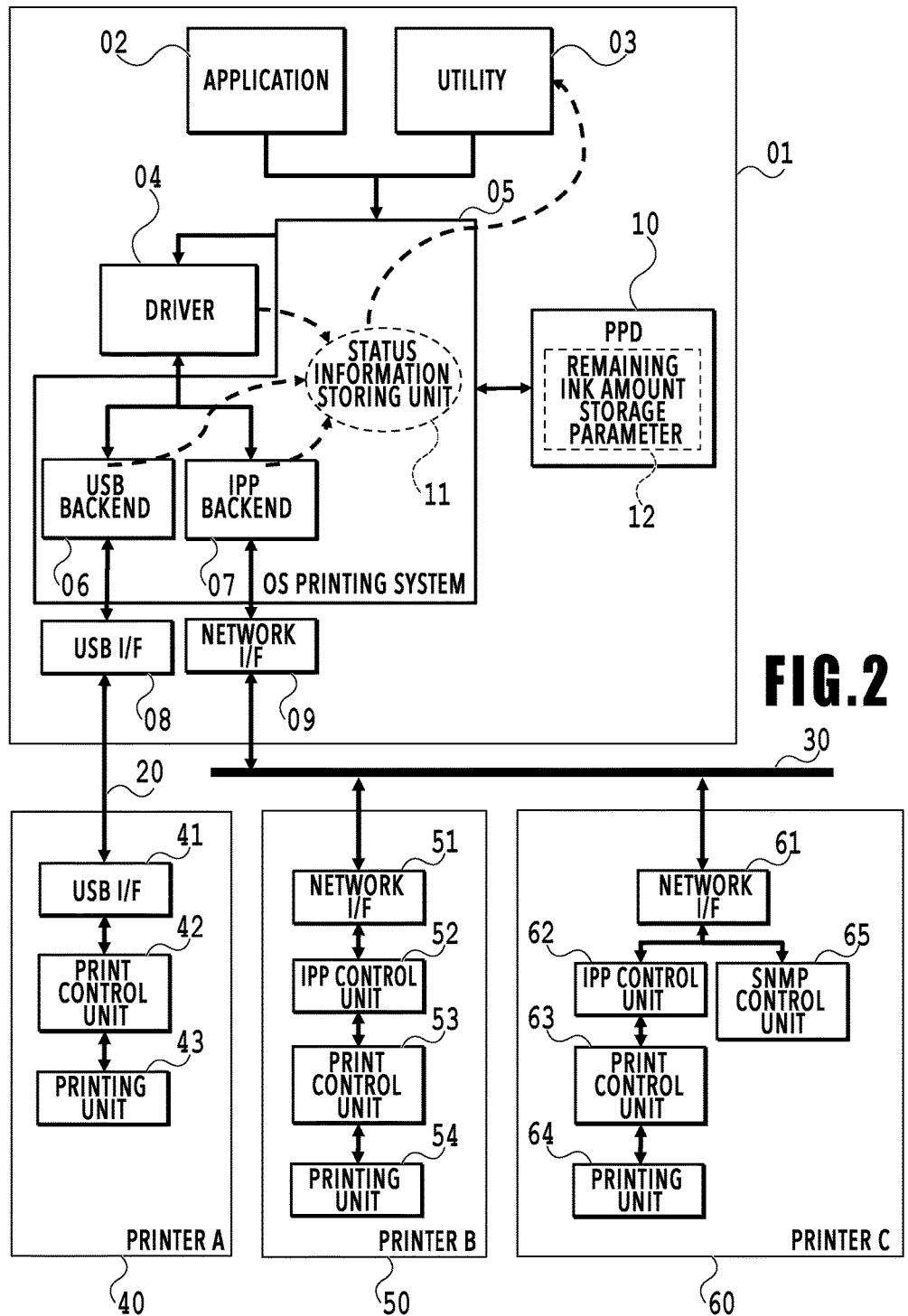
FIG. 2 is a diagram showing a software configuration of the printing system.

FIG. 2 is a diagram showing a software configuration of the printing system. The present embodiment is described on the assumption of a CUPS (Common UNIX (registered trademark) Printing System) included in macOS as an OS printing system.

As described with reference to FIG. 1, the PC 01 and the printer A40 are connected via a USB cable. The PC 01 is connected to the printer B50 and the printer C60 via a network. The printer B50 and the printer C60 support IPP (Internet Printing Protocol) as a printing protocol. The printer C60 also supports SNMP (Simple Network Management Protocol). Hereinafter, control configurations of the respective printers will simply be described.

The printer A40 includes a USB I/F 41, a print control unit 42, and a printing unit 43. The USB I/F 41 is an interface used for data communication with the PC 01. The print control unit 42 controls the printing unit 43 in accordance with print data and various commands received from the USB I/F 41 and also programs stored in advance in the apparatus. The printing unit 43 includes a print head, an ink tank that supplies ink to the print head, and a mechanism that actually performs print operation such as a conveying system for a print sheet. Upon receiving print data to be printed through the USB I/F 41, the print control unit 42 controls the printing unit 43 in accordance with the received print data and prints an image on the print sheet. Upon receiving a status request command through the USB I/F 41, the print control unit 42 transmits requested status information through the USB I/F 41.

The printer B50 includes a network I/F 51, an IPP control unit 52, a print control unit 53, and a printing unit 54. The network I/F 51, the print control unit 53, and the printing unit 54 have the same functions as those of the printer A40. The IPP control unit 52 converts print data and various commands that the network I/F 51 receives using an IPP protocol into a format that can be accepted by the print control unit 53 and provides them to the print control unit 53. Furthermore, upon receiving a status request command of the printer, status information on the apparatus is provided to the network I/F 51 using the IPP protocol.

The printer C60 includes a network I/F 61, an IPP control unit 62, a print control unit 63, a printing unit 64, and a SNMP control unit 65. The network I/F 61, the IPP control unit 62, the print control unit 63, and the printing unit 64 have the same functions as those of the printer B50. Upon receiving a message from the network I/F 61 using a SNMP protocol, the SNMP control unit 65 interprets the message and responds to it.

Next, the software configuration on the PC 01 side will be described. Application 02 is software for generating image data (application data) under instructions from a user. Once a user instructs to print an image, the application 02 provides the generated image data to an OS printing system 05 together with parameters that specify the type of printer, print quality, and the like.

Utility 03 is software for communicating information between the PC 01 and the printers apart from print operation. For example, a user can check an amount of remaining ink mounted on each of the printers A40, B50, C60 through the utility 03.

A driver 04 is a software module (printer driver) associated with individual printers provided by a printer vendor and generates print data that can be processed by the printers. In a case where the utility displays status information on a printer, typically, a corresponding driver obtains the status information on the printer, formats the information so that the utility can display it in a detailed and proper manner to the user, and stores it in a shared area.

The OS printing system 05 mediates between the application 02 or utility 03, the driver 04, and the printers, to appropriately process a command from the user to generate a job for each printer and manage the information obtained from the printer. The driver 04, which is a vendor module, is also activated by the OS printing system 05, receives instructions from the application 02 and the utility 03 through the OS printing system 05, and provides information.

In the OS printing system 05, a backend as a communication unit for communication with the printers is prepared for each form of communication. In the present embodiment, a USB backend 06 and an IPP backend 07 are prepared as an OS standard. In connecting to the printer A40 connected by a USB, the OS printing system 05 activates the driver 04 and the USB backend 06. Then, the driver 04 communicates with the printer A40 via the USB backend 06. Meanwhile, in connecting to the printer B50 or the printer C60 connected via a network, the OS printing system 05 activates the driver 04 and the IPP backend 07. The driver 04 then uses the IPP backend 07 to communicate with the printer B50 or the printer C60. At this time, since the printer C60 supports SNMP, the IPP backend 07 also communicates using SNMP.

The OS printing system 05 is provided with a status information storing unit 11 for storing status information on each printer. In the present embodiment, the status information storing unit 11 is used as a unit that mainly stores remaining ink amount information. To the status information storing unit 11, the USB backend 06 and the IPP backend 07 can also directly write the information obtained from each printer. To the status information storing unit 11, the driver 04 can also write the information obtained from the USB backend 06 and the IPP backend 07 after performing predetermined processing on the information.

The PPD file 10 is a file provided by a printer vendor (PostScript Printer Description) and is managed for each connected printer. On the PPD file 10, specification of each printer, such as resolution and allowable paper sizes, a communication method, and the like are described. Based on the information on the corresponding printer stored in the PPD file 10, the OS printing system 05 and the driver 04 generate print data to be transmitted to the printer and control print operation.

In the PPD file 10, also a remaining ink amount storage parameter 12 indicating whether to enable or disable writing of remaining ink amount information to the status information storing unit 11 by the IPP backend 07 is managed for each printer. The driver 04 and the IPP backend 07 refer to the remaining ink amount storage parameter 12 in the PPD file 10 through the OS printing system 05, obtain the remaining ink amount information on the printer depending on the content of the remaining ink amount storage parameter 12, and store the obtained remaining amount information in the status information storing unit 11. Details will be described later.

In the above-described configuration, once a print command for an image created by a user in the application 02 is transmitted, data is generated in which parameters such as the type of printer, a print mode, and the number of prints are attached to the image data created in the application 02. Then, the OS printing system 05 sends the data to the driver 04. The driver 04 analyzes the received data as a print job, performs predetermined image processing on the image data according to the attached information, converts the image data to print data that can be printed by a specified printer, and then provides the print data to the OS printing system 05. The OS printing system 05 activates a corresponding backend and transmits the print data to the printer through the backend.

In other words, with a command for specifying printing by the printer A40, the OS printing system 05 activates the USB backend 06 and transmits the print data to the printer A40 through the USB I/F 08. With a command for specifying printing by the printer B50 or the printer C60, the OS printing system 05 activates the IPP backend 07 and transmits the print data to the printer B50 or the printer C60 through a network I/F 09.

Figure 3:
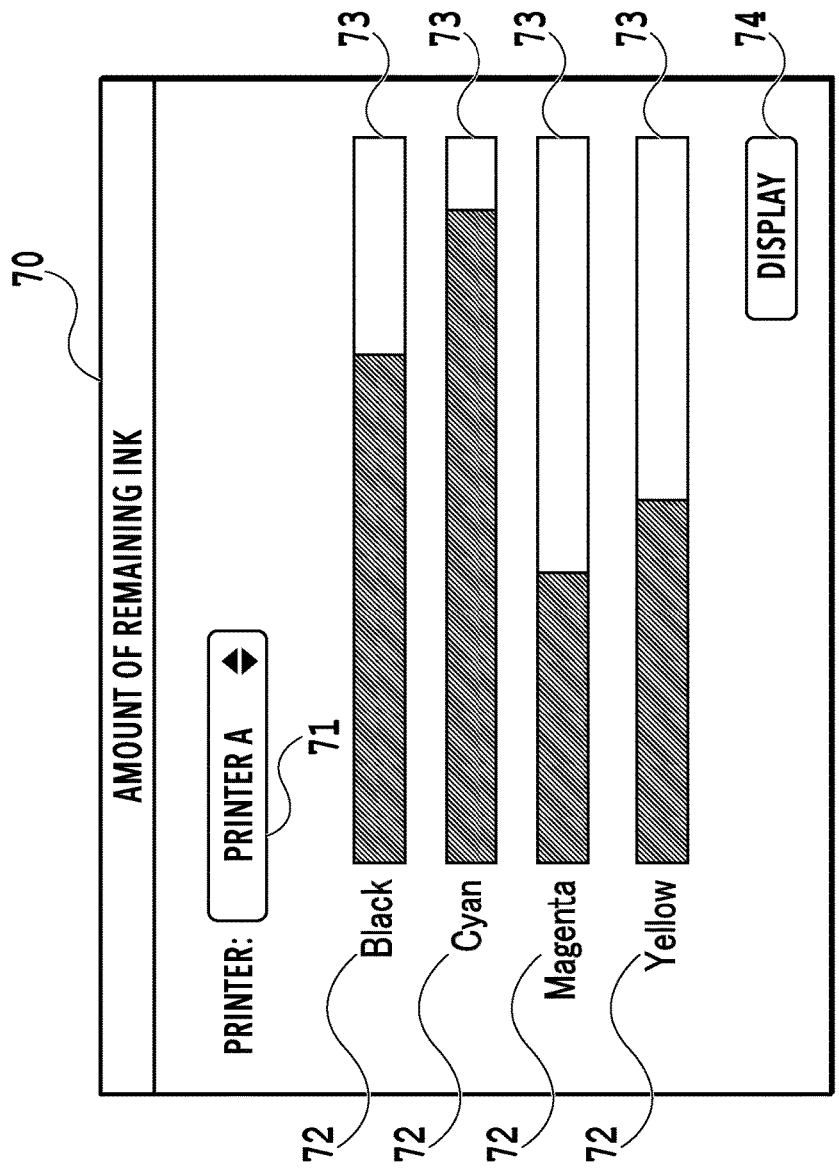
FIG. 3 is a diagram showing a display screen of an amount of remaining ink displayed on a display.

Meanwhile, a user can check a status of a printer such as an amount of remaining ink by using the utility 03 apart from print operation. FIG. 3 shows an example of a remaining ink amount screen 70 that the utility 03 displays on a display in a case when the user checks an amount of remaining ink. On the remaining ink amount screen 70, a printer selection pop-up menu 71, ink tank names 72, remaining amount bars 73 corresponding to the ink tanks, and a display button 74 are displayed.

The printer selection pop-up menu 71 is a menu for a user to specify a printer for which the user wishes to check an amount of remaining ink. The user can change the type of printer by clicking up and down arrows. FIG. 3 shows a case where "Printer A" is specified. After specifying the printer for which the user wishes to check an amount of remaining ink in the pop-up menu 71, by clicking the display button 74, the ink tank name 72 mounted on the specified printer and the remaining amount bar 73 corresponding to each ink tank are displayed. FIG. 3 shows a case where "Printer A" has four types of ink tanks mounted thereon: black, cyan, magenta, and yellow. As a shaded area in the remaining amount bar 73 increases, the amount of remaining ink contained in the corresponding ink tank increases.

It should be noted that the types and number of ink tanks that can be mounted vary depending on printers. In a monochrome printer, for instance, only one tank containing black ink is mounted, and on the remaining ink amount screen 70, one remaining amount bar 73 corresponding to one ink tank name 72 is displayed. In a printer having light-color ink such as light cyan, light magenta, and gray, or particular color ink such as red, green, and blue, the ink tank names 72 and remaining amount bars 73 corresponding to all of these inks are displayed in a manner associated with each other. In either case, if the user specifies the printer in the printer selection pop-up menu 71 and clicks the display button 74 in this state, amounts of remaining inks corresponding to the names of the ink tanks mounted on the specified printer are displayed.

Hereinafter, a specific description will be given of processing performed by each software module in a case where a user generates a command for checking an amount of remaining ink for a printer by using the utility 03. It should be noted that although several flowcharts performed by individual software modules shown in FIG. 2 will be described, in terms of hardware, the CPU 100 shown in FIG. 1 performs the flowcharts in accordance with the programs stored in the ROM 101 or the hard disk 103.

Figure 4:
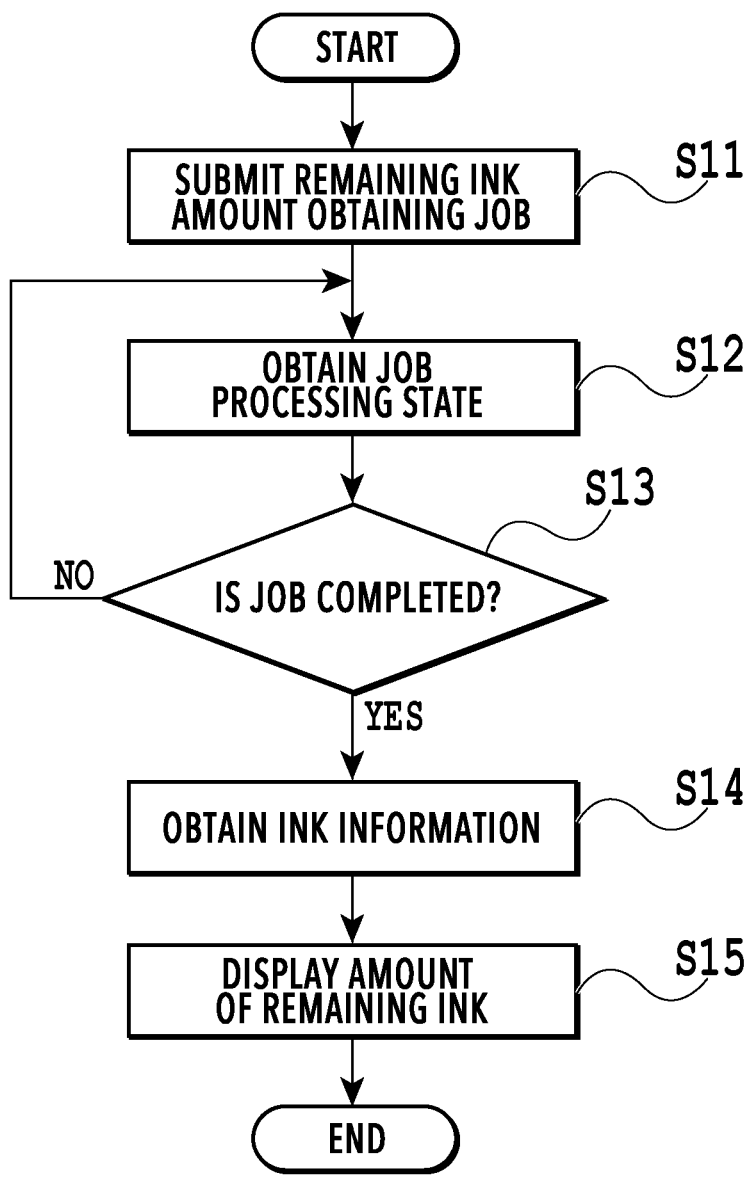
FIG. 4 is a flowchart performed by utility in checking status information.

FIG. 4 is a flowchart for explaining the steps performed by the utility 03 in a case where a user checks status information on a printer by using the utility 03. By way of example, the case of obtaining remaining ink amount information as an example of the status information on the printer will be described. However, the utility 03 may perform processing according to the following flow for any other information on a printer.

The present processing is started by a user clicking the display button 74 on the remaining ink amount screen 70 shown in FIG. 3. Once the present processing is started, in step S11, the utility 03 submits a remaining ink amount obtaining job to the OS printing system 05. At this time, the remaining ink amount obtaining job includes also a printer name selected in the printer selection pop-up menu 71 on the remaining ink amount screen 70.

Next, in step S12, the utility 03 accesses the OS printing system 05, obtains a processing state of the remaining ink amount obtaining job transmitted in step S11, and determines whether or not the processing of the remaining ink amount obtaining job is completed (step S13). Until the job is determined to be completed in step S13, the utility 03 repeats the processing in step S12 and step S13.

If the job is determined to be completed in step S13, the utility 03 proceeds to step S14, and obtains the remaining ink amount information stored in the status information storing unit 11 in the OS printing system 05.

Next, in step S15, the utility 03 displays the remaining ink amount screen 70 based on the remaining ink amount information obtained in step S14. That is, as shown in FIG. 3, the obtained remaining ink amount information is displayed with the ink tank name 72 associated with the remaining amount bar 73. Then, the present processing is finished.

Figure 5:
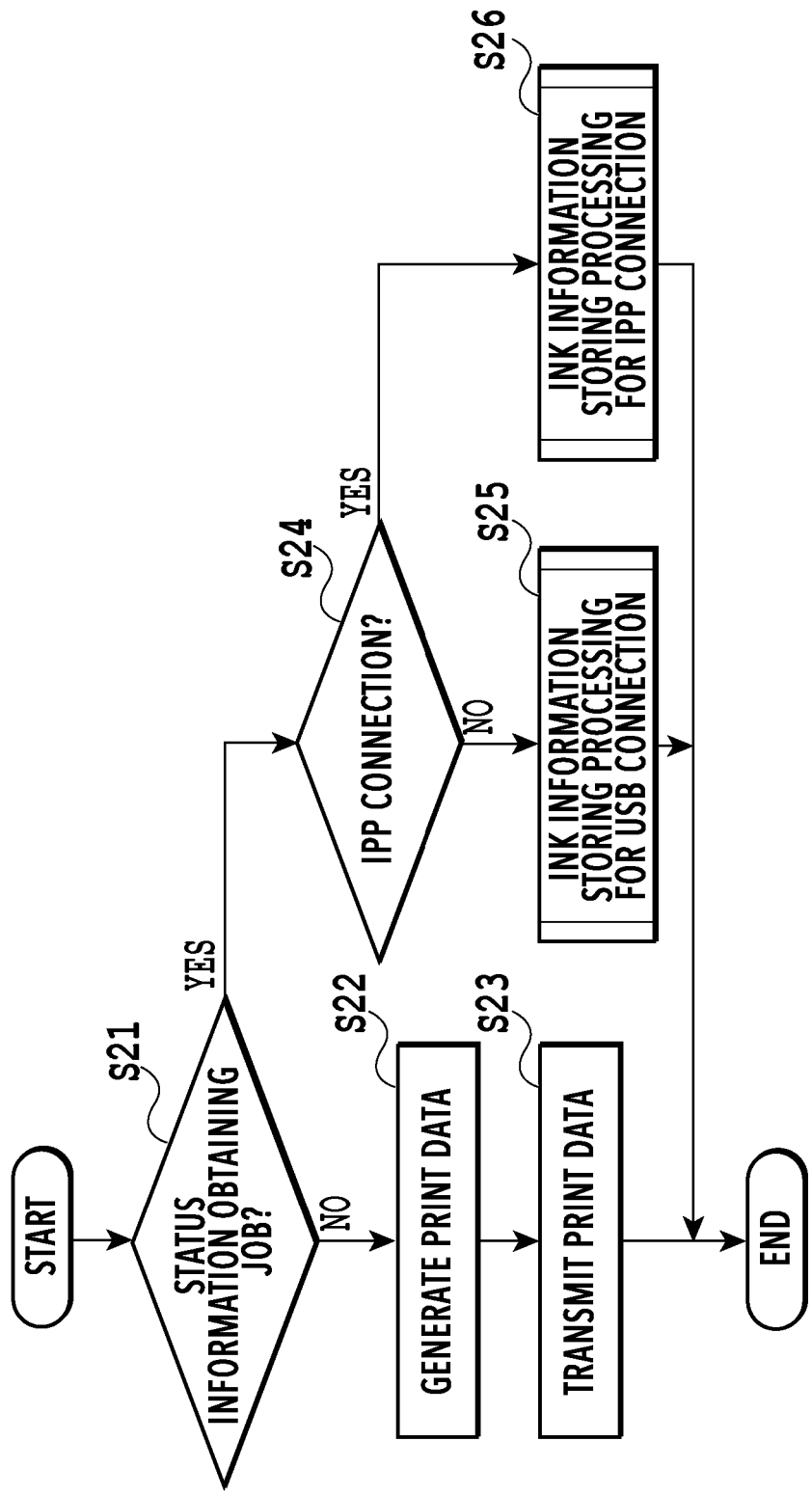
FIG. 5 is a flowchart on activation of a driver.

FIG. 5 is a flowchart for explaining the steps performed by the driver 04 on activation of the driver 04. The present processing is started on activation of the driver 04 in a case where the OS printing system 05 receives a print job from the application 02 or receives a status information obtaining job from the utility 03.

Once the present processing is started, first in step S21, the driver 04 determines whether the received job is a print job or a status information obtaining job. If the received job is a print job, the driver 04 proceeds to step S22 and performs predetermined image processing on image data included in the received print job and generates print data that can be processed by the printer specified in the print job. After that, the driver 04 proceeds to step S23 and transmits the print data generated in step S22 to the printer through the backend in the OS printing system 05 that corresponds to the specified printer.

Meanwhile, if the received job is determined to be a status information obtaining job in step S21, the driver 04 proceeds to step S24 and determines whether or not a form of connection to the printer specified in the job is IPP connection. If it is determined that the connection is not IPP connection, the driver 04 proceeds to step S25 and performs status information obtaining processing for USB connection. Meanwhile, if it is determined that the connection is IPP connection, the driver 04 proceeds to step S26 and performs status information obtaining processing for IPP connection. Then, the present processing is finished.

Figure 6:
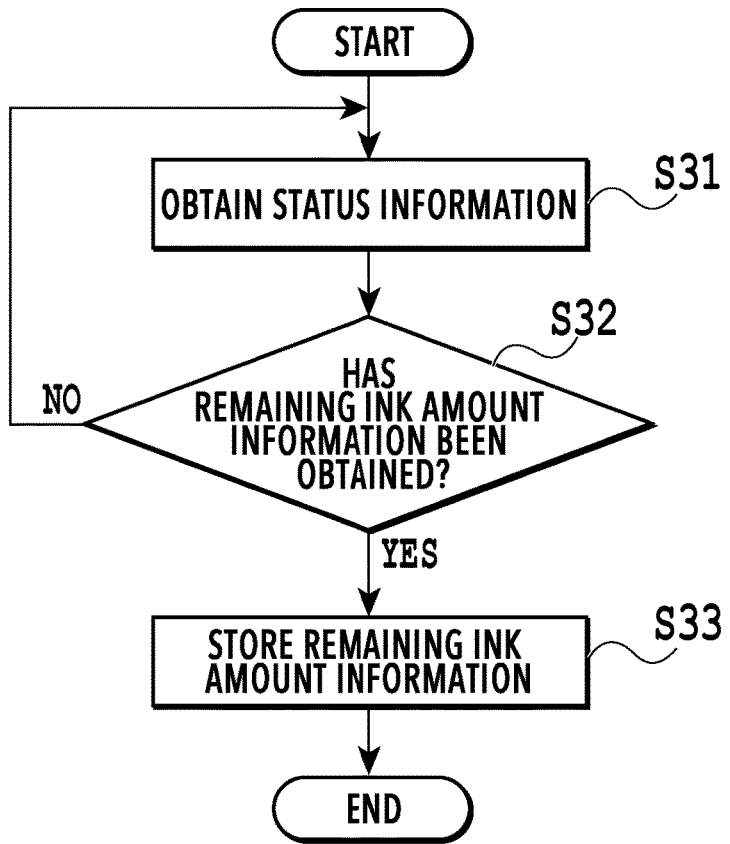
FIG. 6 is a flowchart for explaining status information obtaining processing for USB connection.

FIG. 6 is a flowchart for explaining the status information obtaining processing for USB connection performed by the driver 04 in step S25 in FIG. 5 in a case where a remaining ink amount obtaining job is submitted for the status information obtaining processing. Once the present processing is started, in step S31, the driver 04 obtains status information on a specified printer (the printer A40 in the present embodiment) through the USB backend 06 in the OS printing system.

In step S32, the driver 04 determines whether or not the status information obtained in step S31 includes remaining ink amount information. The status information obtaining processing in step S31 and the determination processing in step S32 are repeated until the status information is determined to include remaining ink amount information.

If the status information is determined to include remaining ink amount information in step S32, the driver 04 proceeds to step S33 and extracts the remaining ink amount information from the status information and stores it in the status information storing unit 11 in the OS printing system 05. Then, the present processing is finished.

It should be noted that, since the case where the remaining ink amount obtaining job is submitted is assumed in the above description, the example of extracting only the remaining ink amount information from the status information and storing it is described. However, information to be obtained by the driver 04 may be other status information. In this case, the driver 04 may obtain the information through the same steps as those described with reference to FIG. 6 and store the information in a predetermined location in the status information storing unit 11. Then, the present processing is finished.

Figure 7:
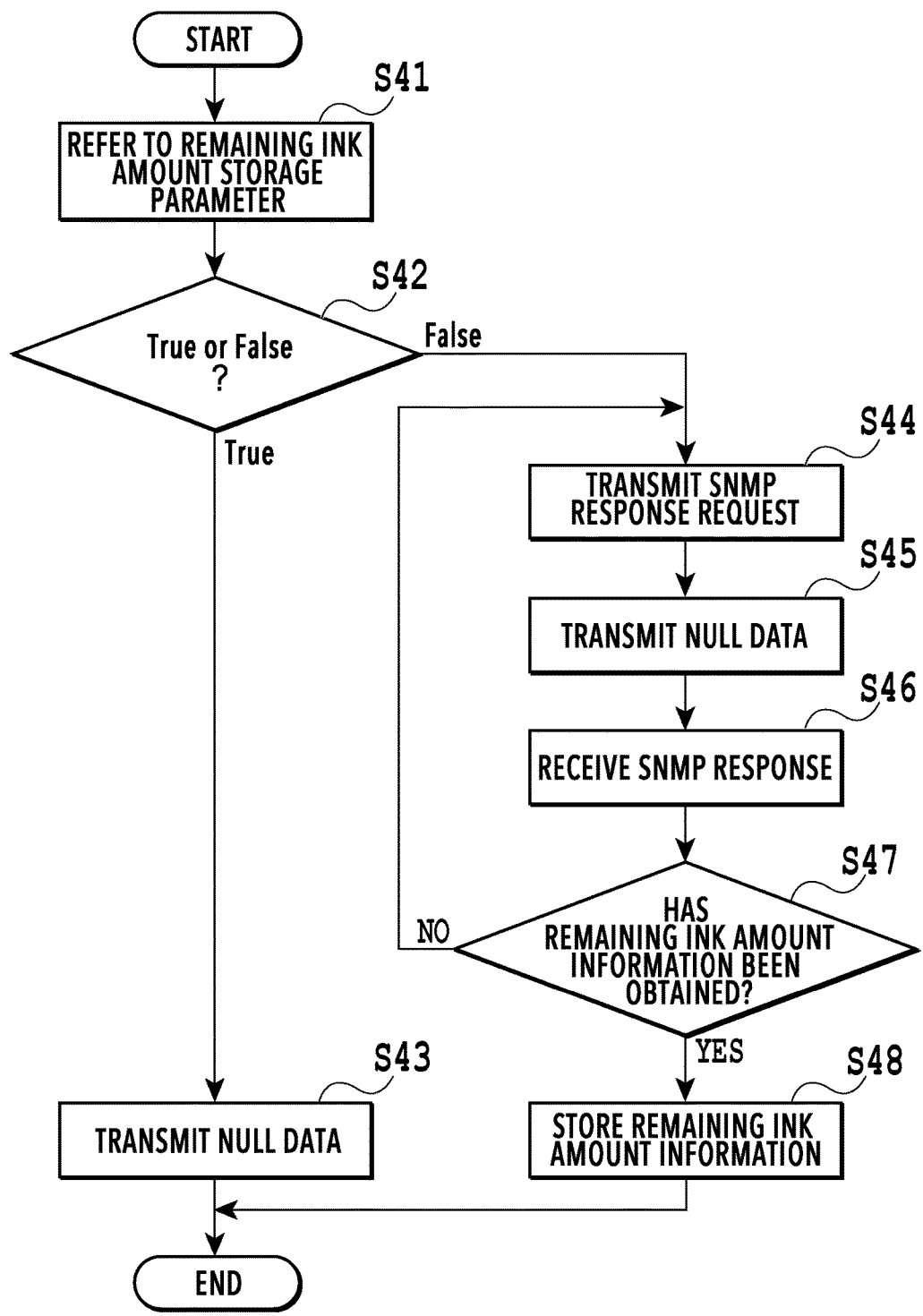
FIG. 7 is a flowchart for explaining status information obtaining processing for IPP connection.

FIG. 7 is a flowchart for explaining status information obtaining processing for IPP connection performed by the driver 04 in step S26 in FIG. 5 in a case where a remaining ink amount obtaining job is submitted for the status information obtaining processing. Once the present processing is started, first in step S41, the driver 04 accesses the PPD file 10 through the OS printing system 05 and refers to the remaining ink amount storage parameter 12 of the corresponding printer.

FIG. 8A to FIG. 8C are diagrams showing a specific content of parameters stored in the PPD file 10. FIG. 8A shows part of a PPD file for the printer A40. FIG. 8B shows part of a PPD file for the printer B50. FIG. 8C shows part of a PPD file for the printer C60. In each PPD file, "*ModelName" which is a key indicating a product name of a printer and "*cupsIPPSupplies" which is a value indicating a remaining ink amount storage parameter of the printer are associated with each other and stored.

As for "*ModelName" serving as a key, names such as "Printer A," "Printer B," and "Printer C" are described. As for "cupsIPPSupplies" serving as a value, either "True" or "False" is described. As used herein, "True" means to "enable" the IPP backend 07 to store remaining ink amount information of a corresponding printer. Meanwhile, "False" means to "disable" the IPP backend 07 from storing remaining ink amount information of a corresponding printer. The driver 04 and the IPP backend 07 can recognize a value associated with a specified key by specifying the key "*ModelName" and inquiring of the OS printing system 05.

With reference to FIG. 8A to FIG. 8C, "False" is set for the printer A40 connected by a USB and the printer C60 which is connected via a network and supports SNMP. This means that for the printer A40 and the printer C60, the driver 04, not the IPP backend 07, is caused to store the remaining ink amount information. Meanwhile, "True" is set for the printer B50 which is connected via a network and does not support SNMP. This means that for the printer B50, the IPP backend 07 is caused to store the remaining ink amount information.

Referring back to the flowchart of FIG. 7, after referring to the remaining ink amount storage parameter in step S41, the driver 04 proceeds to step S42 and determines whether a setting content is "True" or "False." In a case where the setting content is "True," the driver 04 transmits NULL data corresponding to one byte to the IPP backend 07 (step S43), and the present processing is finished.

Meanwhile, In a case where a setting content is "False" in step S42, the driver 04 transmits a SNMP response request to the IPP backend 07 in step S44. Then in step S45, the driver 04 transmits NULL data to the IPP backend 07 and further receives a SNMP response in step S46.

In step S47, the driver 04 determines whether or not the information received in step S46 includes remaining ink amount information. The above step S44 to step S47 are repeated until the information received in step S47 is determined to include remaining ink amount information.

When the information is determined to include remaining ink amount information in step S47, the driver 04 proceeds to step S48 and extracts the remaining ink amount information from the status information and stores it in the status information storing unit 11 in the OS printing system 05. Then, the present processing is finished.

It should be noted that the reason why the driver 04 transmits NULL data corresponding to one byte to the IPP backend 07 in step S43 and step S45 is that the IPP backend 07, which is a standard module provided by macOS, does not obtain a response from a printer unless it receives some print data. In other words, in the present embodiment, NULL data is used to cause the IPP backend 07 to obtain a response from a printer even in a case where the utility 03 submits a job not involving print operation, such as checking an amount of remaining ink, to the OS printing system 05. Incidentally, the NULL data is dummy data which a printer does not need to process. The data transmitted by the driver 04 in step S43 and step S45 does not always need to be NULL data as long as the data serves as a dummy for obtaining a response from a printer. The data may also be an activation command of a printer or a null character which a printer reads and discards.

Figure 9:
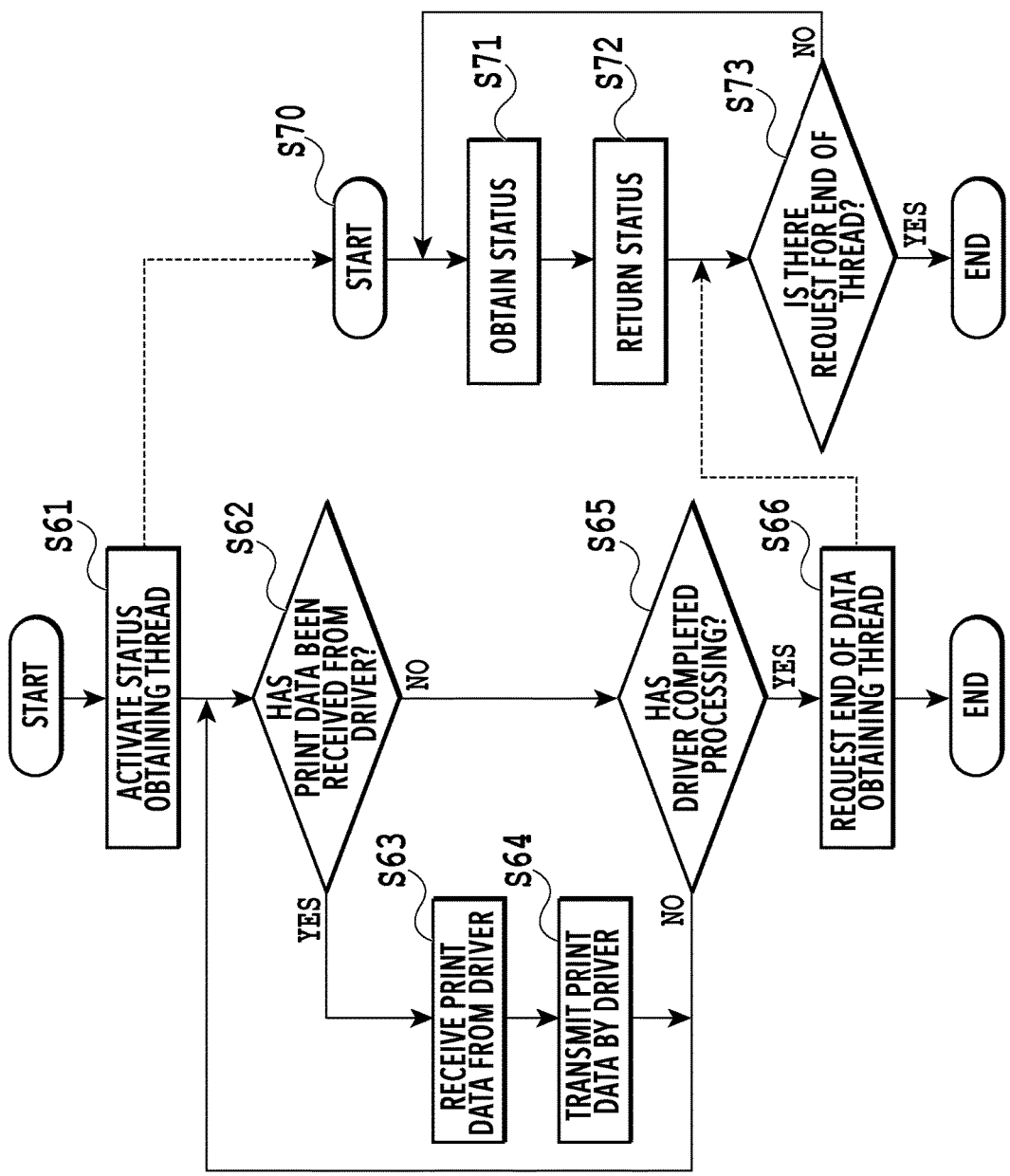
FIG. 9 is a flowchart on activation of a USB backend.

FIG. 9 is a flowchart for explaining processing performed by the USB backend 06 on activation of the USB backend 06 by the OS printing system 05. Once the present processing is started, in step S61, the USB backend 06 activates a status obtaining thread for a printer connected by a USB. That is, even if the USB backend 06 is activated by a print job, the USB backend 06 transmits print data according to the print job and obtains status information on a printer according to a status obtaining job in parallel.

After activating the status obtaining thread in step S61, the USB backend 06 proceeds to step S62 and determines whether or not print data has been received from the driver 04. In a case where it is confirmed that the print data has been received, the USB backend 06 proceeds to step S63 and receives the print data from the driver 04 and transmits it to the printer (the printer A40 in this example) through the USB I/F 08. The printer A40 that has received the print data prints an image according to the received print data.

After the data transmission is completed in step S64, the USB backend 06 goes back to step S62 and checks whether or not new print data has been received. The reception of print data in step S63 and transmission of print data in step S64 as described above are repeated until it is determined that there is no new print data received in step S62.

If it is determined that there is no new print data received in step S62, the process proceeds to step S65, and the USB backend 06 determines whether or not the driver 04 has completed the processing. In a case where the processing has not been completed, since another print data may have been generated, the USB backend 06 goes back to step S62 to check whether or not new print data has been received. Meanwhile, if it is determined that the driver 04 has completed the processing in step S65, the process proceeds to step S66, and after requesting the end of the status obtaining thread activated in step S61, the present processing is finished.

Meanwhile, after rising the status obtaining thread in step S61 and before requesting the end of the status obtaining thread in step S66, a status obtaining job is performed in parallel with the above-described print job. The status obtaining job will be described below.

Once the status obtaining thread is activated in step S61, the USB backend 06 starts the status obtaining job by transmitting a status obtaining command to the printer (step S70). After that, the USB backend 06 repeats obtaining status information from the printer (step S71) and transmitting the obtained status information to the driver 04 (step S72) until a request for the end of the data obtaining thread is confirmed in step S73. The status information at this time may include, for example, a progress of print operation, as well as an amount of remaining ink. If a request for the end of the data obtaining thread is confirmed in step S73, the present processing is finished.

Figure 10:
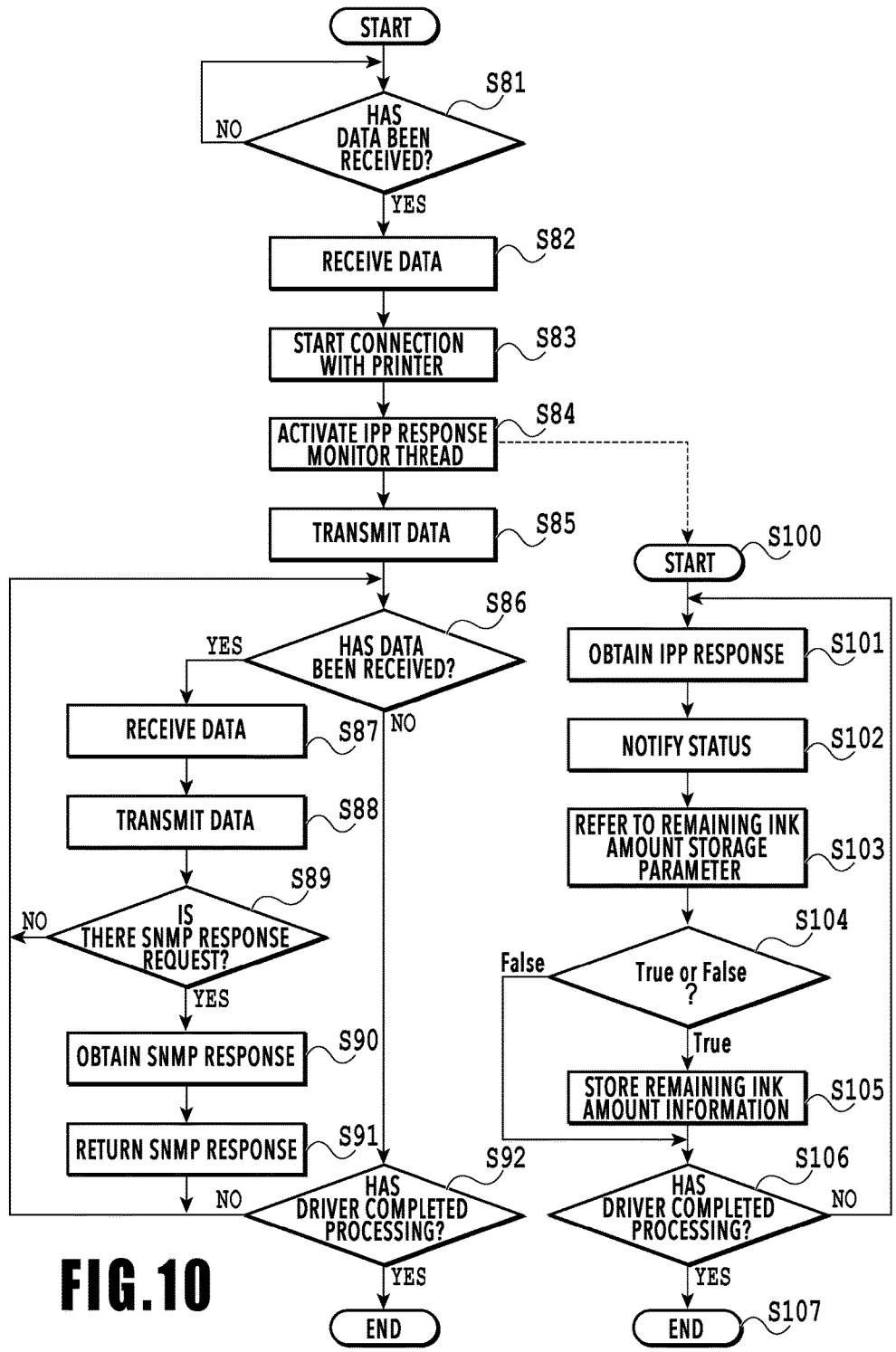
FIG. 10 is a flowchart on activation of an IPP backend.

FIG. 10 is a flowchart for explaining processing performed by the IPP backend 07 on activation of the IPP backend 07 by the OS printing system 05. Once the present processing is started, first in step S81, the IPP backend 07 determines whether or not data has been received from the driver 04 and waits until data reception is confirmed.

If data reception is confirmed in step S81, the IPP backend 07 proceeds to step S82 and receives the data. In a case where the OS printing system 05 activates the IPP backend 07 in response to the print job received from the application 02, the data that the IPP backend 07 receives in step S82 is the print data transmitted by the driver 04 in step S23 in FIG. 5. Meanwhile, in a case where the OS printing system 05 activates the IPP backend 07 in response to the status information obtaining job received from the utility 03, the data that the IPP backend 07 receives in step S82 is the NULL data transmitted by the driver in step S43 or step S45 in FIG. 7. In either case, upon receiving any data, the IPP backend 07 proceeds to step S83 and starts connection to the specified printer.

In step S84, the IPP backend 07 activates an IPP response monitor thread for a printer in IPP connection. After that, the IPP backend 07 transmits the data and obtains status information on the printer according to the IPP response monitor thread in parallel.

In step S85, the IPP backend 07 transmits the data received in step S82 to the printer. At this time, in a case where the data is actual data (print data), not NULL data, the printer starts print operation according to the print data. Meanwhile, in a case where the received data is NULL data, the printer ignores the data.

Next in step S86, the IPP backend 07 determines whether or not new data has been received from the driver 04. In a case where new data has been received, the IPP backend 07 proceeds to step S87 and receives the data. After then, the IPP backend 07 further proceeds to step S88 and transmits the data to the printer. If the data is not NULL data, the printer continues the print operation according to the print data. If the data is NULL data, the NULL data serves to trigger a SNMP response in the following steps.

In step S89, the IPP backend 07 determines whether or not the driver 04 has sent a SNMP response request. The SNMP response request is a request that is sent by the driver 04 in step S44 in FIG. 7 only in a case where a target printer supports SNMP, i.e., in a case where a target printer is in IPP connection and a value of a remaining ink amount storage parameter is "False." Accordingly, if a SNMP response request is confirmed in step S89, since the target printer supports SNMP, the IPP backend 07 obtains a SNMP response from the printer in step S90 and returns the SNMP response to the driver 04 in step S91. If the returned information includes remaining ink amount information, the information is stored in the status information storing unit 11 by the driver 04 in step S48 in FIG. 7.

After that, the IPP backend 07 goes back to step S86 to determine whether new data has been received. In this manner, in a case where bidirectional communication is performed through SNMP, the IPP backend 07 repeats transmitting the NULL data and obtaining and transmitting the SNMP response. Meanwhile, also in a case where it is determined that there is no SNMP response request in step S89, the IPP backend 07 goes back to step S86 to determine whether new data has been received.

In a case where it is determined that there is no new data received in step S86, the IPP backend 07 proceeds to step S92 and determines whether or not the driver 04 has completed the processing. In a case where the processing has not been completed, since another print data may have been received, the IPP backend 07 goes back to step S86 to determine whether or not there is next print data. In a case where it is determined that the driver 04 has completed the processing in step S92, the present processing is finished.

Meanwhile, after rising the IPP response monitor thread in step S84 and before confirming completion of the processing of the driver 04, an IPP response monitor job is performed in parallel with the above-described print job. The IPP response monitor thread will be described below.

Once the IPP response monitor thread is activated in step S84, the IPP backend 07 starts the status obtaining thread by transmitting a status obtaining command to the printer (step S100). First in step S101, the IPP backend 07 obtains an IPP response from the printer and notifies a status of the printer to the OS printing system 05 based on the obtained IPP response in step S102.

In step S103, the IPP backend 07 refers to the remaining ink amount storage parameter 12 in the PPD file 10 through the OS printing system 05, and determines whether the setting is "True" or "False" in step S104. If the setting is "True," the IPP backend 07 proceeds to step S105 and stores the remaining ink amount information based on the IPP response obtained by itself in step S101 in the status information storing unit 11 in the OS printing system 05, and then proceeds to step S106. Meanwhile, if the setting of the remaining ink amount storage parameter 12 in step S104 is "False," the IPP backend 07 does not store the remaining ink amount information and directly proceeds to step S106.

In step S106, the IPP backend 07 determines whether or not the driver 04 has completed the processing. If the processing has been completed, the present processing is finished. If the driver 04 has not completed the processing, the IPP backend 07 goes back to step S101 and continues the IPP response monitor. Then, the present processing is finished.

According to the above-described present embodiment, the utility 03 displays the remaining ink amount information on the printer A40 connected by a USB according to the information stored in the status information storing unit 11 by the driver 04 in step S48 in FIG. 7. The utility 03 also displays the remaining ink amount information on the printer C60 that is connected via a network and supports SNMP according to the information stored in the status information storing unit 11 by the driver 04 in step S33 in FIG. 6. Meanwhile, as for the printer C60 which is not connected via a network and does not support SNMP, the utility 03 displays an amount of remaining ink according to the information stored in the status information storing unit 11 by the IPP backend 07 in step S105 in FIG. 10. Each type of information is obtained when the user clicks the display button 74 on the screen 70 of the utility shown in FIG. 3.

As described above, according to the present embodiment, status information on a printer connected via a network under a macOS environment can be stored by appropriately transmitting NULL data to the IPP backend 07 from the driver 04. This allows a user to appropriately check nearly real-time status information such as an amount of remaining ink independently of the print operation.

(Second Embodiment)

Also in the present embodiment, like the first embodiment, the printing system shown in FIG. 1 and FIG. 2 is used. Other than the flowchart of the status information obtaining processing for IPP connection described with reference to FIG. 7, the same flowcharts as those in the first embodiment, i.e., the flowcharts described with reference to FIG. 4 to FIG. 6, FIG. 9, and FIG. 10, will be used.

In the first embodiment, in the status information storing processing for IPP connection shown in FIG. 7, the driver 04 transmits NULL data to the printer that does not support SNMP in step S43 and the processing is finished. Meanwhile, as shown in the flowchart of FIG. 10, the IPP response monitor thread activated in step S84 is finished when it is confirmed that the processing of the driver 04 is completed in step S106. In this case, if the processing of the driver 04 is finished earlier than the start of the IPP response monitor thread, the processing in the IPP response monitor thread from step S101 to step S105 may not be performed normally. Accordingly, in the present embodiment, there is provided a step for causing the driver 04 to check the operation of the IPP backend 07 so as to complete the processing of the driver 04 after confirming that the IPP backend 07 has started communication with the printer.

Figure 11:
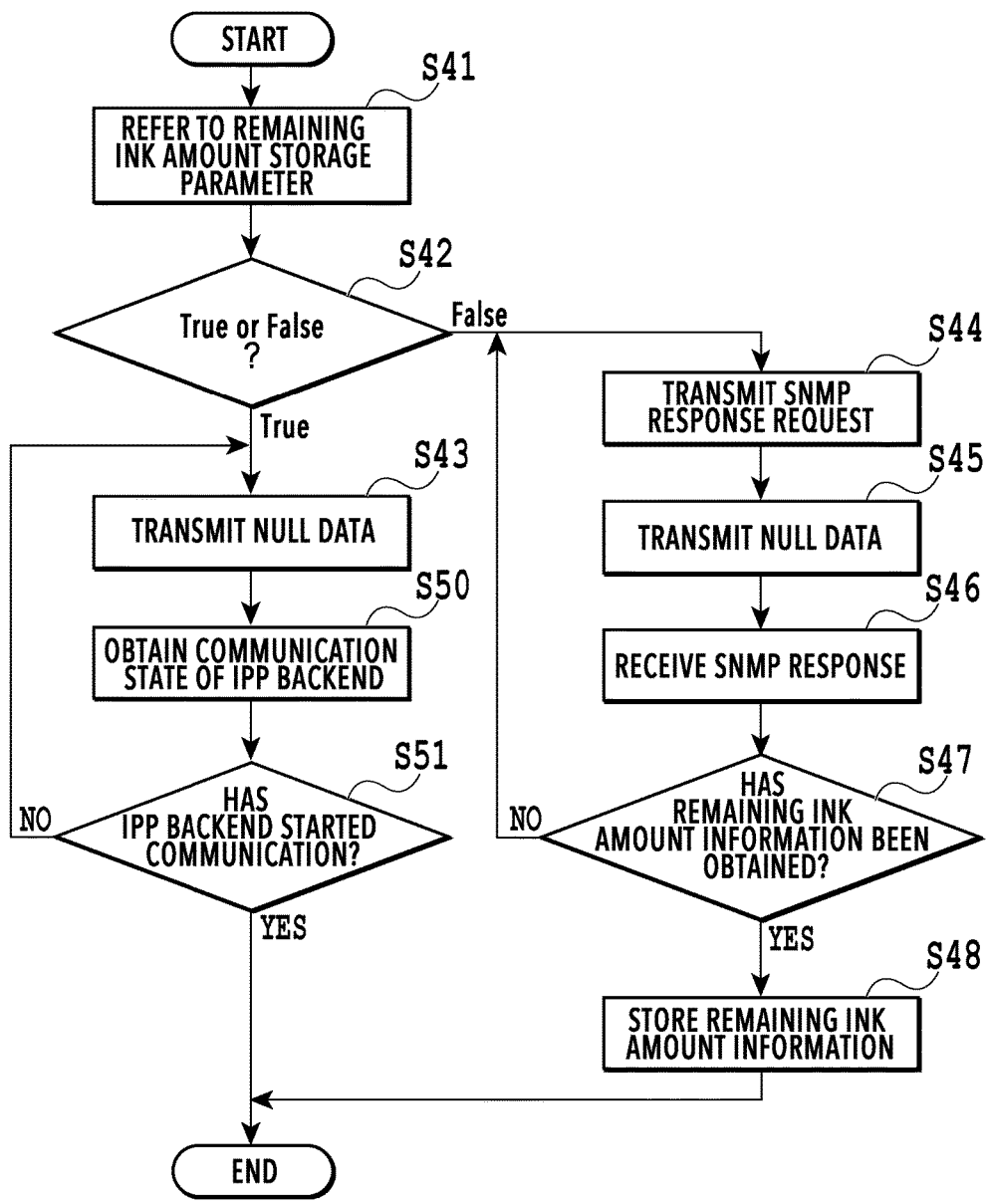
FIG. 11 is a flowchart for explaining status information obtaining processing for IPP connection.

FIG. 11 is a flowchart for explaining status information obtaining processing for IPP connection performed by the driver 04 of the present embodiment in step S26 in FIG. 5 in a case where a remaining ink amount obtaining job is generated. A difference from the flowchart of FIG. 7 described in the first embodiment is that step S50 and step S51 are added. Accordingly, only these steps will be described below.

After transmitting NULL data to the IPP backend 07 in step S43, the driver 04 obtains a communication state of the IPP backend 07 in step S50. Once the IPP backend 07 starts communication with the printer, a message is notified to the OS printing system 05. Accordingly, in step S50, the driver 04 can obtain a communication state of the IPP backend 07 by accessing the OS printing system 05.

Next, the driver 04 proceeds to step S51 and determines whether the IPP backend 07 has started communication with the printer from the obtained communication state. If it is determined that the IPP backend 07 has not started communication, the driver 04 goes back to step S43 and transmits NULL data again. The driver 04 will repeat Step S43 to step S51 until it can be confirmed that the IPP backend 07 has started communication in step S51. If it can be confirmed that the IPP backend 07 has started communication in step S51, the driver 04 finishes the present processing (status information obtaining processing for IPP connection).

According to the above-described present embodiment, even in a case where the driver 04 causes the IPP backend 07 to obtain status information on a printer and store the obtained information, the driver 04 completes its own processing after confirming the start of communication of the IPP backend 07. Accordingly, it is possible to not only process the IPP response monitor thread but also store the remaining ink amount information by the IPP backend 07 more reliably.

It should be noted that in the present embodiment, the driver 04 detects start of communication of the IPP backend 07, but the present embodiment is not limited to this. The driver may, for example, detect that the IPP backend 07 has notified a state of a printer to the OS printing system 05 or detect that the IPP backend 07 has stored the remaining ink amount information and the like to the status information storing unit 11. In either case, as long as it can be confirmed that the IPP backend 07 is performing bidirectional communication, an effect of the present embodiment can be obtained.

(Third Embodiment)

Also in the present embodiment, like the first embodiment, the printing system shown in FIG. 1 and FIG. 2 is used. Other than the flowchart of the status information obtaining processing for IPP connection described with reference to FIG. 7, the same flowcharts as those in the first embodiment, i.e., the flowcharts described with reference to FIG. 4 to FIG. 6, FIG. 9, and FIG. 10, will be used.

In the first and second embodiments, the driver transmits NULL data to the IPP backend 07 in the OS. Based on the NULL data, the IPP backend 07 obtains an IPP response from a printer to obtain and store the remaining ink amount information. In a case where the printer supports SNMP, the SNMP protocol is used. That is, the driver transmits NULL data to the IPP backend 07 and the IPP backend 07 obtains a SNMP response from the printer based on the NULL data. Then, the IPP backend 07 transmits the SNMP response to the driver so that the driver obtains the remaining ink amount information from the SNMP response and stores it in the status information storing unit 11. This is because the status information obtained and stored by the driver by using SNMP is more convenient for a user as compared to the status information specifically stored by the IPP backend 07 from the IPP response. More specifically, names of printers and ink tanks and the like are detailed information, which allows more precise information to be presented to the user.

However, communication using SNMP may sometimes require a longer time for communication due to a low response speed depending on a network environment and its communication state, or may fail to obtain information in the end. In the present embodiment, therefore, in a case of a printer supporting SNMP, the driver 04 is caused to confirm a communication state of SNMP. Then, if a normal communication state cannot be confirmed, even for a printer which supports SNMP, the IPP backend 07 in the OS printing system 05 is caused to perform communication and storing. Without a driver, the IPP backend 07 can perform communication and storing processing reliably at a higher speed.

To realize the above functions, in the present embodiment, the driver 04 is allowed to rewrite a content (value) of the remaining ink amount storage parameter 12 stored in the status information storing unit 11. As for the information corresponding to an initial value before rewritten, that is, information indicating whether or not the printer supports SNMP, the driver 04 stores it in its own memory in advance.

Figure 12B:
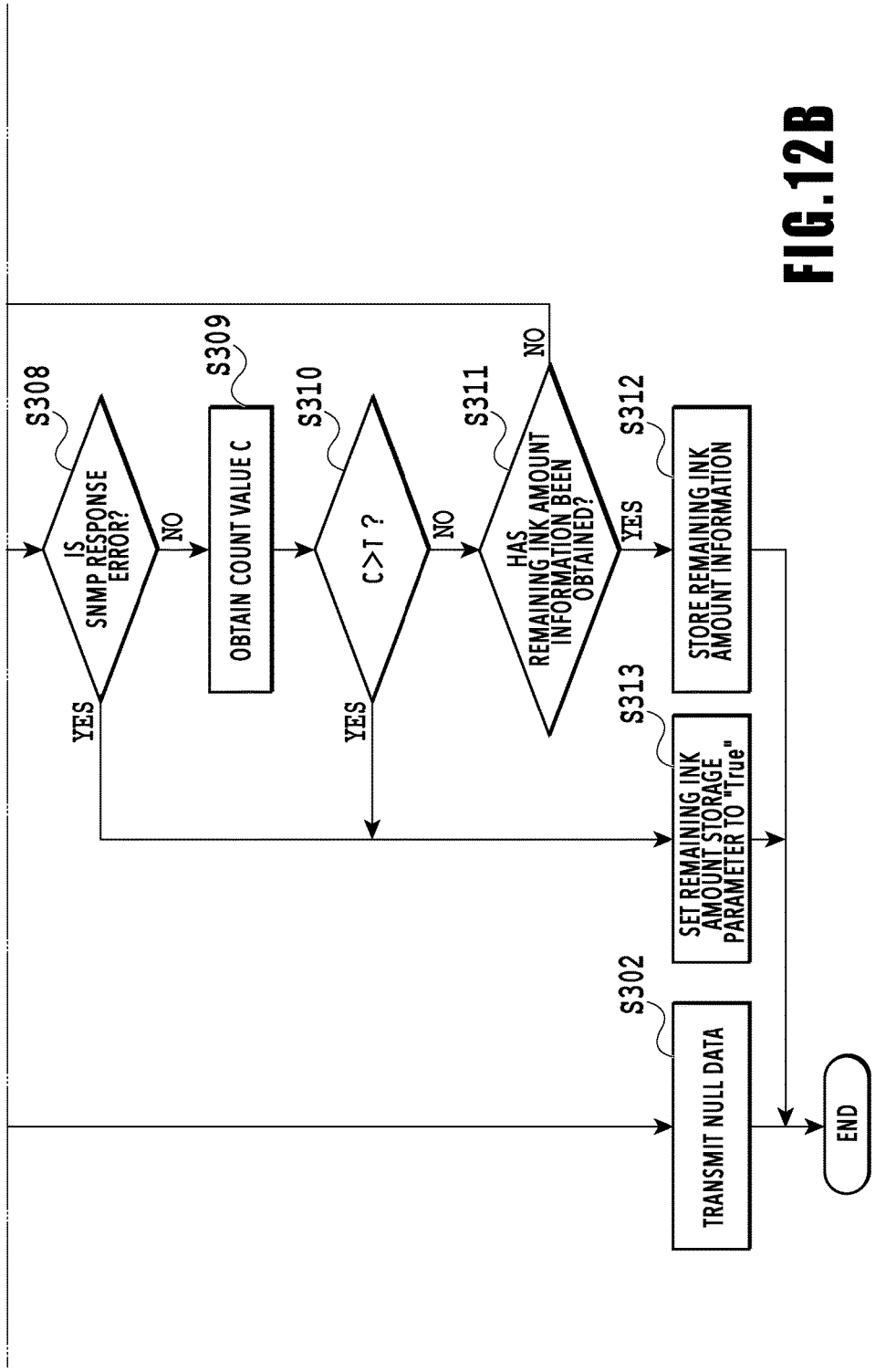
FIG. 12B is a flowchart for explaining status information obtaining processing for IPP connection.

FIGS. 12A and 12B show a flowchart for explaining status information obtaining processing for IPP connection performed by the driver 04 of the present embodiment in step S26 in FIG. 5 in a case where a remaining ink amount obtaining job is submitted.

Once the present processing is started, first in step S300, the driver 04 obtains SNMP support information stored in its own memory. In step S301, the driver 04 determines whether or not a target printer for communication supports SNMP based on the obtained information.

In a case where it is determined that the target printer does not support SNMP in step S301, the driver 04 proceeds to step S302 and completes the present processing after transmitting NULL data to the IPP backend 07. With the transmission of NULL data in step S302, an IPP response monitor thread is activated in the IPP backend 07. That is, in the IPP backend 07, like the processing in step S84 and the following steps in FIG. 10, an IPP response is obtained, and remaining ink amount information is obtained and stored.

Meanwhile, in a case where it is determined that the target printer supports SNMP in step S301, the driver 04 proceeds to step S303 and sets the remaining ink amount storage parameter stored in the PPD file 10 to "False." Further in step S304, the driver 04 initializes a count value C of a timer for determining a response state of SNMP (C=0).

In the following step S305 to step S307, the same processing as that performed in step S44 to step S46 in FIG. 7 described in the first embodiment is performed. That is, the driver 04 transmits a SNMP response request to the IPP backend 07 in step S305, transmits NULL data in step S306, and further receives a SNMP response in step S307.

In step S308, the driver 04 determines whether or not a SNMP response result received in step S307 is normal. In a case where it is determined that the response result is not normal, i.e., an error, the driver 04 proceeds to step S313 and rewrites the remaining ink amount storage parameter 12 in the PPD file 10 as "True" and completes the present processing. Since the NULL data has already been transmitted to the IPP backend 07 in step S306, the IPP response monitor thread has been activated in the IPP backend 07. That is, in the IPP backend 07, like the processing in step S84 and the following steps in FIG. 10, an IPP response is obtained, and remaining ink amount information is obtained and stored.

Meanwhile, in a case where it is determined that the response result is normal in step S308, the driver 04 obtains a count value C of the timer in step S309 and determines whether or not the count value C obtained in step S310 exceeds a threshold T. In a case where the determination is C>T in step S309, the driver 04 proceeds to step S313 and rewrites the remaining ink amount storage parameter 12 in the PPD file 10 as "True" and completes the present processing. Since the NULL data has already been transmitted to the IPP backend 07 in step S306, the IPP response monitor thread has been activated in the IPP backend 07. That is, in the IPP backend 07, like the processing in step S84 and the following steps in FIG. 10, an IPP response is obtained, and remaining ink amount information is obtained and stored.

In a case where the determination is C≤T in step S310, the driver 04 proceeds to step S311 and determines whether or not the response received in step S307 includes remaining ink amount information. If it is determined that remaining ink amount information is not included, the driver 04 goes back to step S305 and continues communication using SNMP.

Meanwhile, in a case where it is determined that remaining ink amount information is included in step S311, the driver 04 proceeds to step S312 and extracts the remaining ink amount information from the obtained information and stores it in the status information storing unit 11 in the OS printing system 05. Then, the present processing is finished.

In the present embodiment, the threshold T for comparison with the count value C of the timer in step S310 is set at an allowable maximum time for obtaining remaining ink amount information through SNMP communication. Such a threshold is not particularly limited, but may be set at about ten seconds, for example. That is, provided T=10 seconds, if a time C elapsed from the start of communication using SNMP exceeds ten seconds, it is determined that the communication using SNMP requires too much time, and the driver 04 switches to single processing by the IPP backend 07 that is performed more reliably at a higher speed. That is, it is determined that the communication is not performed normally and the remaining ink amount storage parameter 12 is rewritten as "True" in step S313. Then, from the IPP response, the IPP backend 07 obtains and stores the status information.

It should be noted that even if the remaining ink amount storage parameter 12 is rewritten as "True" in step S313, next time the processing in FIGS. 12A and 12B is performed, the remaining ink amount storage parameter 12 is rewritten as "False" again in step S303, and the communication using SNMP is started. That is, even in a case where a speed of the communication using SNMP is not stable due to a state of a network, if the communication using SNMP can be performed normally, this communication takes priority and a state of an amount of remaining ink can be displayed in a detailed and proper manner to the user.

As described above, according to the present embodiment, in a case where the communication using SNMP is not performed normally in spite of the assumption of the communication using SNMP, a communication method is switched to single communication by the IPP backend 07 that is performed more reliably at a higher speed. As used herein, the case where the communication is not performed normally refers to, for example, a case where an error occurs in communication or a case where communication takes too much time. Accordingly, the user can confirm remaining ink amount information on a printer connected via a network more reliably at a higher speed irrespective of a state of SNMP communication.

(Fourth Embodiment)

As described above, in the case where a printer connected via a network under a macOS environment supports SNMP, there are two methods for obtaining status information from the printer: a method performed by the IPP backend by using an IPP response without the involvement of a driver and a method performed by a driver using SNMP. In the former case, status information on a printer can be reliably obtained at a high speed, but it is difficult to display localization information such as a model number and a name of ink on a utility screen because there is no support from the driver. On the other hand, in the latter case, with the involvement of the driver, processing is additionally performed on the information obtained by the IPP backend, whereby the information can be displayed on the utility screen in a detailed and proper manner. However, there is a problem that a longer time is required for the communication itself.

In view of the above, two steps are provided in the present embodiment: a step of allowing the IPP backend to obtain status information without the involvement of the driver and displaying remaining amount information immediately and a step of adjusting a display screen with the involvement of the driver after obtaining status information. To realize the above functions, also in the present embodiment, like the third embodiment, the driver 04 is allowed to rewrite a content (value) of the remaining ink amount storage parameter 12 stored in the status information storing unit 11. As for the information corresponding to an initial value before rewritten, that is, information indicating whether or not the printer supports SNMP, the driver 04 stores it in its own memory in advance. It should be noted that also in the present embodiment, like the first embodiment, the printing system shown in FIG. 1 and FIG. 2 is used. Other than the utility processing for IPP connection described with reference to FIG. 4 and the flowchart of the status information obtaining processing described with reference to FIG. 7, the same flowcharts as those in the first embodiment, i.e., the flowcharts described with reference to FIG. 5 to FIG. 6, FIG. 9, and FIG. 10, will be used.

Figure 13:
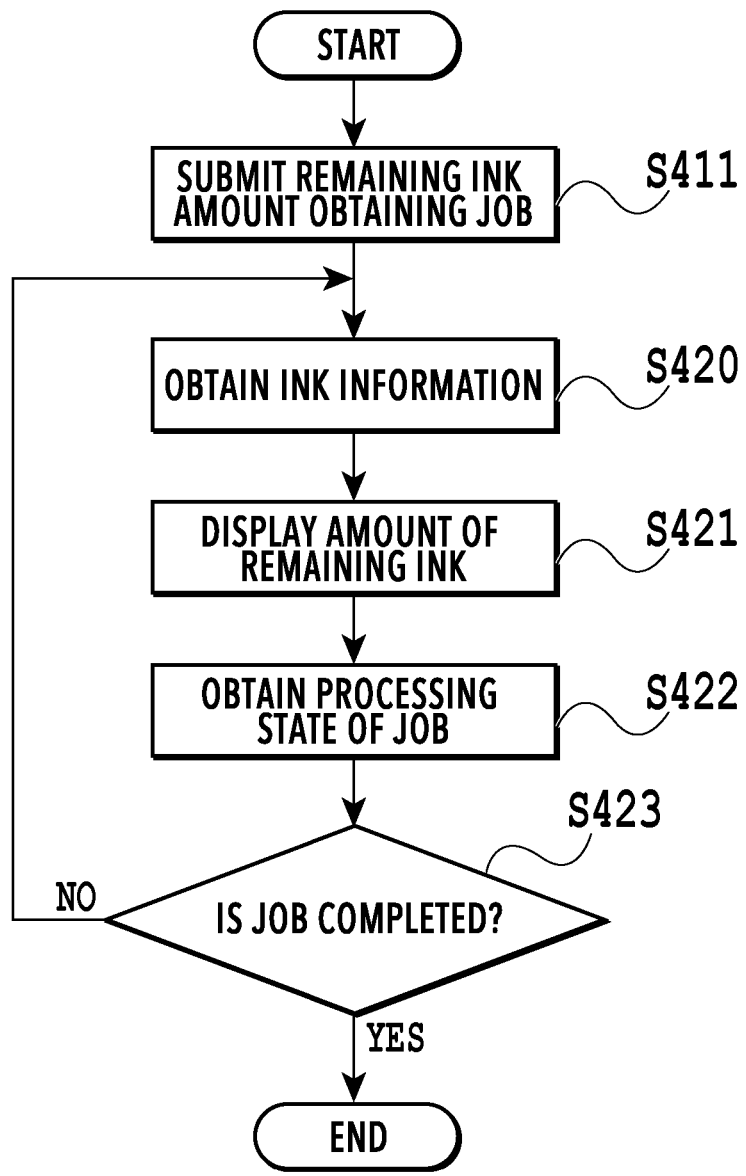
FIG. 13 is a flowchart performed by utility in checking status information.

FIG. 13 is a flowchart performed by the utility 03 in the present embodiment in a case where a user checks an amount of remaining ink. The present processing will be started by a user clicking the display button 74 on the remaining ink amount screen 70 shown in FIG. 3.

Once the present processing is started, in step S411, the utility 03 transmits a remaining ink amount obtaining job to the OS printing system 05. In step S420, the utility 03 obtains remaining ink amount information stored in the status information storing unit 11 in the OS printing system 05. Then in step S421, the utility 03 displays the remaining ink amount screen 70 based on the remaining ink amount information obtained in step S420.

Next in step S422, the utility 03 accesses the OS printing system 05 to obtain a processing state of the remaining ink amount obtaining job. Further in step S423, the utility 03 determines whether or not the processing of the remaining ink amount obtaining job has been completed. If it is determined that the remaining ink amount obtaining job has not been completed, the utility 03 goes back to step S420. The utility 03 again accesses the status information storing unit 11 to obtain remaining ink amount information. Meanwhile, if it is determined that the remaining ink amount obtaining job has been completed in step S422, the present processing is finished.

As descried above, the utility 03 of the present embodiment repeats the step of obtaining information stored in the status information storing unit 11 and the step of displaying the information until it is determined that the processing of the remaining ink amount obtaining job has been completed in step S423. That is, the remaining ink amount screen 70 displayed by the utility 03 is updated multiple times until it is determined that the processing of the remaining ink amount obtaining job has been completed.

Figures 14, 14A, 14B:
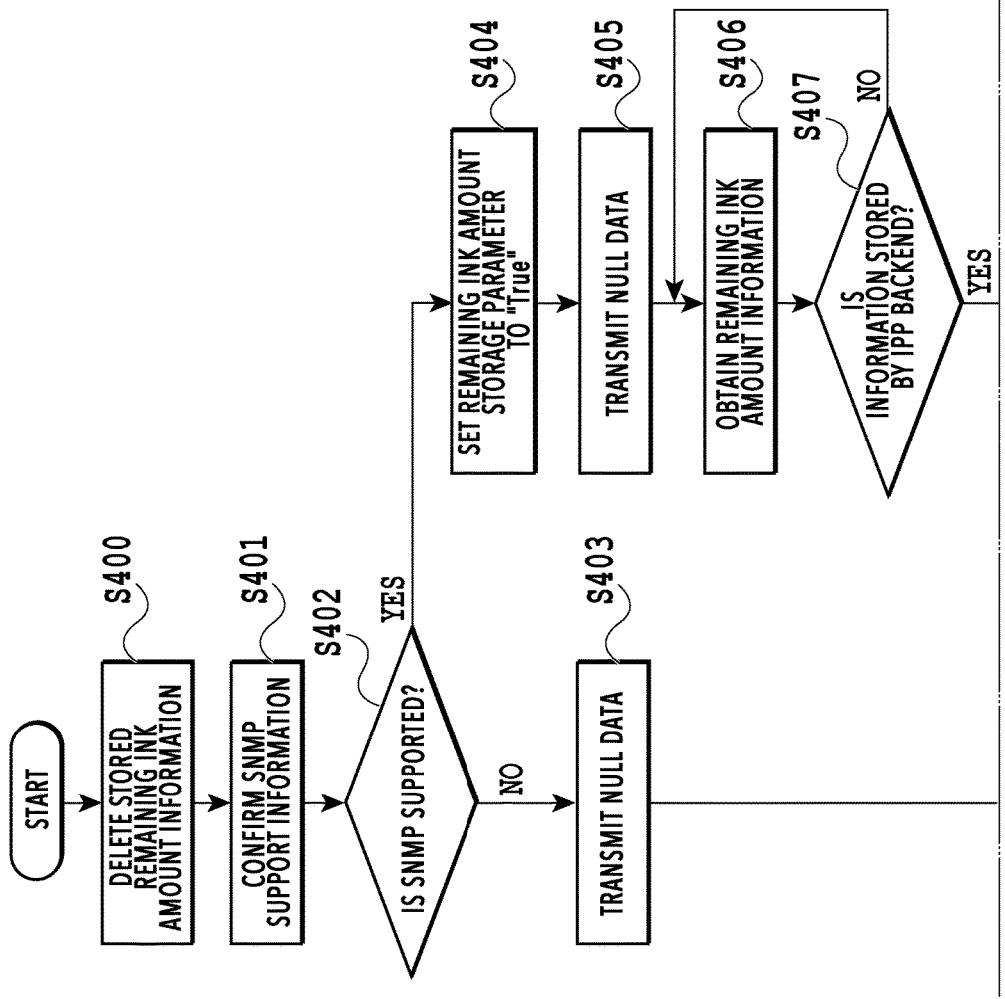
FIG. 14 is a diagram showing the relationship of FIGS. 14A and 14B.
FIG. 14A is a flowchart for explaining status information obtaining processing for IPP connection.
FIG. 14B is a flowchart for explaining status information obtaining processing for IPP connection.

FIGS. 14A and 14B show a flowchart for explaining status information obtaining processing for IPP connection performed by the driver 04 of the present embodiment in step S26 in FIG. 5 in a case where a remaining ink amount obtaining job is submitted.

Once the present processing is started, first in step S400, the driver 04 accesses the status information storing unit 11 in the OS printing system 05 and deletes the remaining ink amount information stored therein. Next, the driver 04 proceeds to step S401 and obtains SNMP support information stored in its own memory. Further in step S402, the driver 04 determines whether or not a target printer for communication supports SNMP based on the obtained information.

If it is determined that a target printer for communication does not support SNMP in step S402, the driver 04 proceeds to step S403 and transmits NULL data to the IPP backend 07. Then, the present processing is finished. Along with the transmission of the NULL data in step S403, an IPP response monitor thread is activated in the IPP backend 07.

Meanwhile, if it is determined that a target printer for communication supports SNMP in step S402, the driver 04 proceeds to step S404 and sets the remaining ink amount storage parameter stored in the PPD file 10 to "True." Further, the driver 04 proceeds to step S405 and transmits NULL data.

In step S406, the driver 04 accesses the status information storing unit 11, and reads remaining ink amount information. At this time, along with the transmission of NULL data in step S405, the IPP response monitor thread is activated. Accordingly, at a stage of step S406, if the IPP backend 07 has already stored remaining ink amount information in the status information storing unit 11, the driver 04 obtains the information. If the IPP backend 07 has not stored remaining ink amount information yet, the driver 04 obtains null information.

Next in step S407, the driver 04 checks the remaining ink amount information obtained in step S406. Then, if the information is not the information stored by the IPP backend 07, that is, if the information is null information, the driver 04 goes back to step S406 and reads out the remaining ink amount information stored in the status information storing unit 11 again.

If the remaining ink amount information stored by the IPP backend 07 is confirmed in step S407, the driver 04 proceeds to step S408 and changes the remaining ink amount storage parameter 12 stored in the status information storing unit 11 from "True" to "False." After this step, writing into the status information storing unit 11 will be performed by the driver 04.

In the following step S409 to step S411, the same processing as that performed in step S44 to step S46 in FIG. 7 described in the first embodiment is performed. That is, the driver 04 transmits a SNMP response request to the IPP backend 07 in step S409, transmits NULL data in step S410, and further receives a SNMP response in step S411.

In step S412, the driver 04 determines whether or not the response received in step S411 includes remaining ink amount information. If it is determined that the remaining ink amount information is not included, the process goes back to step S409, and the driver 04 continues communication using SNMP.

Meanwhile, if it is determined that the remaining ink amount information is included in step S412, the driver 04 proceeds to step S413 and extracts the remaining ink amount information from the obtained information and stores it in the status information storing unit 11 in the OS printing system 05. By storing the remaining ink amount information in step S413, the information that the IPP backend had stored before the remaining ink amount storage parameter was rewritten as "False" in step S408 is written over the remaining ink amount information obtained in S412. Then, the present processing is finished.

Referring back to FIG. 13, after the user clicks the display button 74, the utility 03 of the present embodiment repeats reading of the remaining ink amount information from the status information storing unit 11 and displaying on the remaining ink amount screen 70 until it is determined that the remaining ink amount obtaining job has been completed in step S423. Accordingly, if reading by the utility 03 (step S420) is performed after the remaining ink amount information by the IPP response monitor thread is stored and before the remaining ink amount information through SNMP is overwritten and stored, the former remaining ink amount information is displayed.

In a printer connected via a network, names of individual ink tanks (Cyan, Magenta, Yellow, Black), for example, are often managed in English. Accordingly, the remaining ink amount information directly stored in the status information storing unit 11 by the IPP backend 07 is information where (Cyan, Magenta, Yellow, Black) and their respective amounts of remaining ink are associated with each other. Accordingly, the screen displayed by the utility 03 in step S421 is shown in FIG. 3 as already described.

Figure 15:
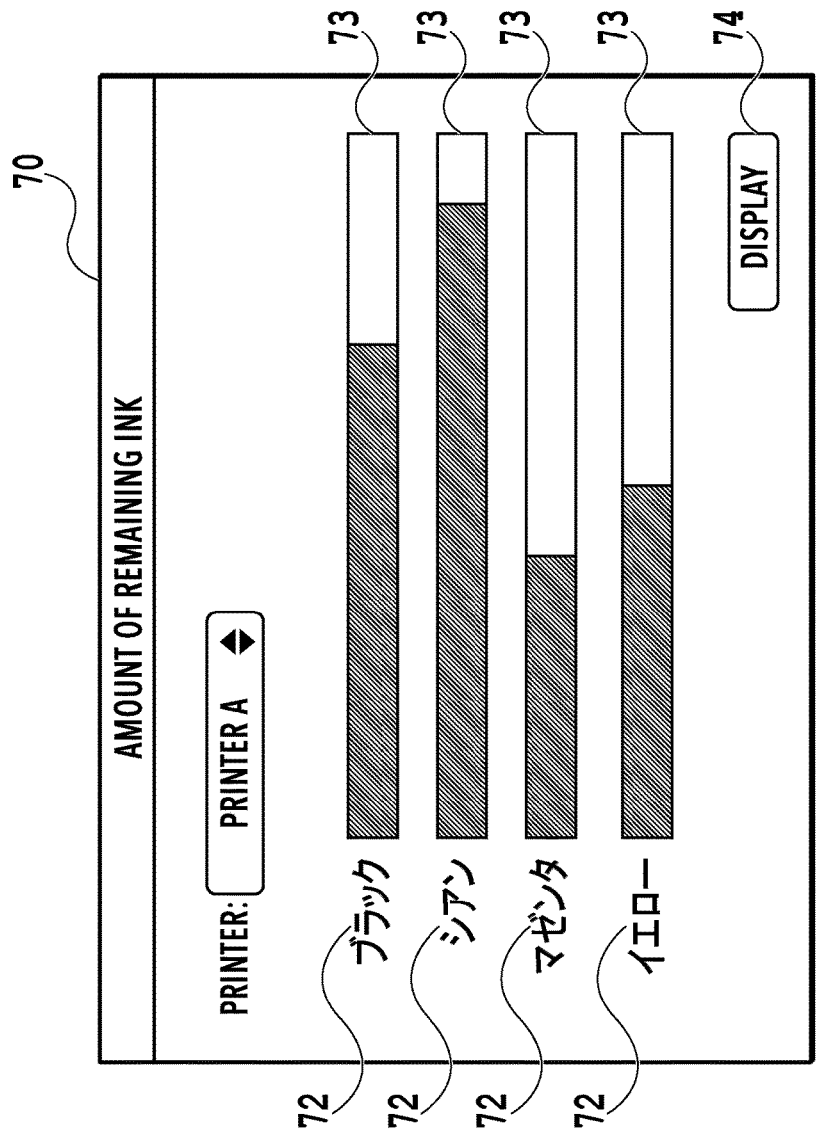
FIG. 15 is a diagram showing a display screen of an amount of remaining ink displayed on a display.

Incidentally, if the driver 04 is involved in storing processing of the information obtained by the IPP backend 07, the driver 04 can rewrite tank names into Japanese writing supported by the OS. In other words, with Cyan, Magenta, Yellow, and Black converted into シアン, マゼンタ, イエロー, and ブラック, respectively, the driver 04 can store the remaining ink amount information in the status information storing unit 11. Accordingly, in step S421, the utility 03 can display the screen as shown in FIG. 15.

For simplicity, the names of four colors of ink tanks are described by way of example. However, in a case where there are a large number of types of similar inks, if a name displayed on an ink tank at hand is different from a name displayed on the remaining ink amount screen 70, a user may be confused. Accordingly, it is preferable that information be displayed in a detailed and proper manner to a user with the involvement of the driver 04. Moreover, it is desirable that information be displayed reliably at a high speed.

According to the present embodiment, it is possible to quickly and certainly respond to a command for obtaining remaining ink amount information, while adjusting the information to be displayed in a detailed and proper manner step by step.

(Other Embodiments)

Description has been given of the case where the amount of remaining ink in an ink tank as an example of an item to be relatively frequently checked by a user is detected and notified in the status information obtaining job. However, the present invention is not limited to such an aspect. In the status information obtaining job, examples of the item to be detected and notified may include an amount of waste ink contained in a waste ink tank, a remaining battery level of a printer driven by a battery, and the like. In either case, in any environment where information relating to a status of a printer connected via a network is needed to be detected and notified, the present invention can effectively function irrespective of the content of the information.

Further, description has been given of the example of the case where bidirectional communication is performed between a PC on which macOS is installed and a printer connected via a network, for example. However, the present invention is not limited to such an aspect. For example, a printing apparatus in which a host device corresponding to the PC used in the above embodiments and a printer device are integrally formed may be employed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, the actual processing may be partly or entirely performed by an OS or the like running on a computer based on an instruction of a program code read by a computer, and the functions of the above-described embodiments may be realized by the processing. Needless to say, the present invention includes such a case as well.

In addition, a program code read from a storage medium may be written into a function extension board inserted into a computer or a memory provided for a function extension unit connected to the computer. Then, the actual processing may be partly or entirely performed by the function extension board or a CPU or the like provided for a function extension unit based on an instruction of the program code, and the functions of the above-described embodiments may be realized by the processing. Needless to say, the present invention includes such a case as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-196256, filed Oct. 6, 2017, which is hereby incorporated by reference wherein in its entirety.

What is claimed is:

1. An information processing method for an information processing apparatus to obtain status information on a printer, the method comprising:
   determining whether a submitted job is a print job for causing the printer to perform a print operation or a status obtaining job for obtaining the status information without causing the printer to perform the print operation;

determining whether a connection method between the information processing apparatus and the printer is a network connection; and transmitting dummy data for obtaining a response from the printer, wherein the dummy data is transmitted in a case where the submitted job is determined to be the status obtaining job and the connection method is determined to be a network connection, and wherein the dummy data is not transmitted in a case where the submitted job is determined to be the status obtaining job and the connection method is determined not to be a network connection.

2. The information processing method according to claim 1, wherein by transmitting the dummy data to an operating system, OS, the dummy data is transmitted to the printer through the OS, and the status information is obtained by the OS.

3. The information processing method according to claim 2, wherein the status information is stored in a memory in the information processing apparatus, and a status of the printer is displayed based on the status information stored in the memory.

4. The information processing method according to claim 1, further comprising confirming whether communication is performed between the OS and the printer, wherein transmitting of the dummy data is repeated until it is confirmed that the communication is performed.

5. The information processing method according to claim 2, wherein the determining and the transmitting are performed by a printer driver, and the status information is stored using at least one of a first storing method and a second storing method, the first storing method being performed by the OS to store the status information based on information obtained by the OS using a first protocol, and the second storing method being performed by the printer driver to store the status information based on information obtained by the printer driver through the OS using a second protocol which is different from the first protocol.

6. The information processing method according to claim 5, further comprising confirming by the printer driver whether communication between the OS and the printer is performed normally, wherein the status information is stored using the second storing method in a case where it is confirmed that the communication is performed normally, and the status information is stored using the first storing method in a case where it is confirmed that the communication is not performed normally.

7. The information processing method according to claim 5, further comprising:

determining whether the printer supports the second protocol; and enabling or disabling storing by the first storing method, wherein in a case where it is determined that the second protocol is supported, the storing by first storing method is disabled, in a case where it is determined that communication by the second protocol is not performed normally, the disabled setting is rewritten to enabled, and after the disable setting is rewritten to enabled, the status information is stored by using the first storing method.

8. The information processing method according to claim 5, further comprising:

determining whether the printer supports the second protocol;

enabling or disabling storing by the first storing method; and obtaining information stored in the memory, wherein in a case where it is determined that the second protocol is supported, the storing by the first storing method is enabled, in a case where the status information is obtained from the memory, the enabled setting is rewritten to disabled, and after the enabled setting is rewritten to disabled, the status information is stored by using the second storing method.

9. The information processing method according to claim 8, wherein after the status information is stored by using the first storing method, the status information is further stored by using the second storing method, and the status information stored in the memory by using the first storing method is displayed and the status information stored in the memory by using the second storing method is displayed.

10. The information processing method according to claim 5, wherein the first protocol is Internet Printing Protocol, IPP, and the second protocol is Simple Network Management Protocol, SNMP.

11. The information processing method according to claim 2, further comprising generating print data in a case where it is determined that a job submitted to the information processing apparatus is the print job.

12. The information processing method according to claim 1, wherein data for obtaining a response from the printer is NULL data.

13. The information processing method according to claim 1, wherein the status information is remaining ink amount information in an ink tank mounted on the printer.

14. The information processing method according to claim 1, wherein the status information is obtained using, Internet Printing Protocol, IPP, or Simple Network Management Protocol, SNMP, in the case where the submitted job is determined to be the status obtaining job and the connection method is determined to be the network connection, and wherein the status information is obtained using a Universal Serial Bus, USB, in the case where the submitted job is determined to be the status obtaining job and the connection method is determined not to be the network connection.

15. The information processing method according to claim 14, wherein the dummy data is transmitted once so that the status information is obtained using IPP, and wherein transmitting the dummy data is repeated until the status information is obtained using SNMP.

16. A non-transitory computer readable storage medium storing a program for performing an information processing method for an information processing apparatus to obtain status information on a printer, the information processing method comprising:

determining whether a submitted job is a print job for causing the printer to perform a print operation or a status obtaining job for obtaining the status information without causing the printer to perform the print operation;

determining whether a connection method between the information processing apparatus and the printer is a network connection; and transmitting dummy data for obtaining a response from the printer, wherein the dummy data is transmitted in a case where the submitted job is determined to be the status obtaining job and the connection method is determined to be the network connection, and wherein the dummy data is not transmitted in a case where the submitted job is determined to be the status obtaining job and the connection method is determined not to be the network connection.

17. The non-transitory computer readable storage medium according to claim 16,
wherein by transmitting the dummy data to an operating system, OS, the dummy data is transmitted to the printer through the OS, and
the status information is obtained by the OS.

18. The non-transitory computer readable storage medium according to claim 17,
wherein the status information is stored in a memory in the information processing apparatus, and
a status of the printer is displayed based on the status information stored in the memory.

19. The non-transitory computer readable storage medium according to claim 17,
wherein the information processing method further comprises
confirming whether communication is performed between the OS and the printer, and
wherein transmitting of the dummy data is repeated until it is confirmed that the communication is performed.

20. The non-transitory computer readable storage medium according to claim 17,
wherein the determining and the transmitting are performed by a printer driver, and
the status information is stored using at least one of a first storing method and a second storing method, the first storing method being performed by the OS to store the status information based on information obtained by the OS using a first protocol, and the second storing method being performed by the printer driver to store the status information based on information obtained by the printer driver through the OS using a second protocol which is different from the first protocol.

21. The non-transitory computer readable storage medium according to claim 20, wherein the information processing method further comprises
confirming by the printer driver whether communication between the OS and the printer is performed normally,
the status information is stored using the second storing method in a case where it is confirmed that the communication is performed normally, and
the status information is stored using the first storing method in a case where it is confirmed that the communication is not performed normally.

22. The non-transitory computer readable storage medium according to claim 20, wherein the information processing method further comprises:
determining whether the printer supports the second protocol; and
enabling or disabling storing by the first storing method, wherein
in a case where it is determined that the second protocol is supported, the storing by first storing method is disabled,
in a case where it is determined that communication by the second protocol is not performed normally, the disabled setting is rewritten to enabled, and
after the disable setting is rewritten to enabled, the status information is stored by using the first storing method.

23. The non-transitory computer readable storage medium according to claim 20, wherein the information processing method further comprises:
determining whether the printer supports the second protocol;
enabling or disabling storing by the first storing method; and
obtaining information stored in the memory,
wherein in a case where it is determined that the second protocol is supported, the storing by the first storing method is enabled,
in a case where the status information is obtained from the memory, the enabled setting is rewritten to disabled, and
after the enabled setting is rewritten to disabled, the status information is stored by using the second storing method.

24. The non-transitory computer readable storage medium according to claim 20, wherein after the status information is stored by using the first storing method, the status information is further stored by using the second storing method, and
the status information stored in the memory by using the first storing method is displayed and the status information stored in the memory by using the second storing method is displayed.

25. The non-transitory computer readable storage medium according to claim 20, wherein the first protocol is Internet Printing Protocol, IPP, and the second protocol is Simple Network Management Protocol, SNMP.

26. The non-transitory computer readable storage medium according to claim 21, wherein the information processing method further comprises generating print data in a case where it is determined that a job submitted to the information processing apparatus is the print job.

27. The non-transitory computer readable storage medium according to claim 16, wherein data for obtaining a response from the printer is NULL data.

28. The non-transitory computer readable storage medium according to claim 16, wherein the status information is remaining ink amount information on an ink tank mounted on the printer.

29. The non-transitory computer readable storage medium according to claim 16,
wherein the status information is obtained using Internet Printing Protocol, IPP, or Simple Network Management Protocol, SNMP, in the case where the submitted job is determined to be the status obtaining job and the connection method is determined to be the network connection, and
wherein the status information is obtained using a Universal Serial Bus, USB, in the case where the submitted job is determined to be the status obtaining job and the connection method is determined not to be the network connection.

30. The non-transitory computer readable storage medium according to claim 29, wherein the dummy data is transmitted once so that the status information is obtained using IPP, and wherein transmitting the dummy data is repeated until the status information is obtained using SNMP.

* * * * *